(12) United States Patent
Yamaguchi

(10) Patent No.: US 11,356,596 B2
(45) Date of Patent: Jun. 7, 2022

(54) IMAGING DEVICE, IMAGING DEVICE CONTROL UNIT, AND IMAGING METHOD FOR ADJUSTING PARAMETERS OF IMAGING DEVICE

(71) Applicant: SONY CORPORATION, Tokyo (JP)

(72) Inventor: Tetsuji Yamaguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 80 days.

(21) Appl. No.: 16/650,419

(22) PCT Filed: Aug. 2, 2018

(86) PCT No.: PCT/JP2018/029082
§ 371 (c)(1),
(2) Date: Mar. 25, 2020

(87) PCT Pub. No.: WO2019/069548
PCT Pub. Date: Apr. 11, 2019

(65) Prior Publication Data
US 2021/0211573 A1 Jul. 8, 2021

(30) Foreign Application Priority Data
Oct. 4, 2017 (JP) .............................. JP2017-193964

(51) Int. Cl.
*H04N 5/232* (2006.01)
*G02B 7/38* (2021.01)
(Continued)

(52) U.S. Cl.
CPC .......... *H04N 5/23216* (2013.01); *G02B 7/38* (2013.01); *G03B 5/00* (2013.01); *G03B 7/00* (2013.01);
(Continued)

(58) Field of Classification Search
None
See application file for complete search history.

(56) References Cited

U.S. PATENT DOCUMENTS 5,266,991 A * 11/1993 McAtee, Jr. ............. G02B 7/28
396/144
5,305,036 A * 4/1994 Tanaka ..................... G02B 7/04
359/700

(Continued)

FOREIGN PATENT DOCUMENTS

JP 2007-194953 A 8/2007
JP 2010-288307 A 12/2010

OTHER PUBLICATIONS

International Search Report and Written Opinion of PCT Application No. PCT/JP2018/029082, dated Nov. 6, 2018, 08 pages of ISRWO.

*Primary Examiner* — Cynthia Segura
(74) *Attorney, Agent, or Firm* — Chip Law Group

(57) ABSTRACT

Proposed are a new and improved imaging device, imaging device control unit, and imaging method capable of stably adjusting various parameters of the imaging device without significantly changing the design of the imaging device. Provided is an imaging device including a rotating shaft insertion portion allowed to be attached to and detached from a housing, a rotating shaft having an operation member being inserted into the rotating shaft insertion portion, a rotation amount detector that detects a rotation amount of the rotating shaft, and a controller that controls a control target based on the rotation amount.

8 Claims, 19 Drawing Sheets

(51) Int. Cl.
  *G03B 5/00* (2021.01)
  *G03B 7/00* (2021.01)
  *G03B 13/32* (2021.01)
  *H04N 5/225* (2006.01)

(52) U.S. Cl.
  CPC .......... *G03B 13/32* (2013.01); *H04N 5/2252* (2013.01); *H04N 5/232122* (2018.08); *G03B 2205/0046* (2013.01)

(56) References Cited

U.S. PATENT DOCUMENTS

| | | | | |
|---|---|---|---|---|
| 6,101,339 | A * | 8/2000 | Miki ................. | H04N 5/23241 396/301 |
| 7,280,151 | B2 * | 10/2007 | Kojima ............ | H04N 5/225251 348/373 |
| 2007/0166027 | A1 * | 7/2007 | Misawa ................ | G03B 17/02 396/529 |
| 2015/0042867 | A1 * | 2/2015 | Shiono .................. | G03B 13/32 348/348 |
| 2018/0129014 | A1 * | 5/2018 | Okawa .................... | G03B 3/10 |
| 2019/0310440 | A1 * | 10/2019 | Kakimoto .............. | G03B 13/36 |

* cited by examiner

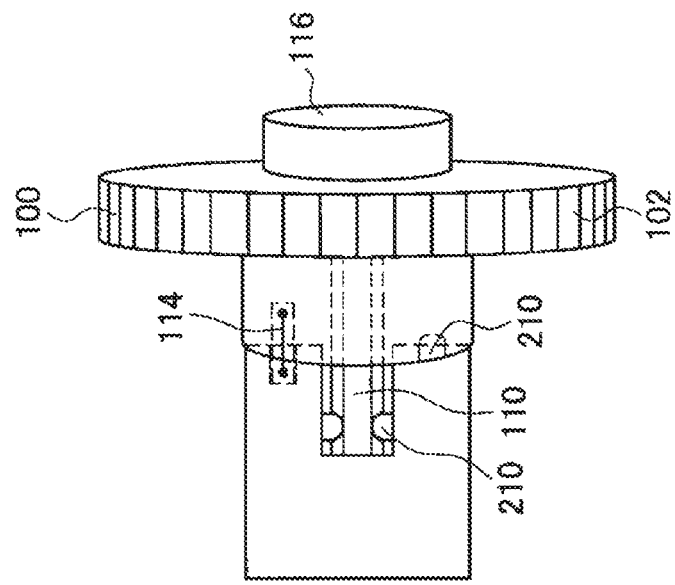
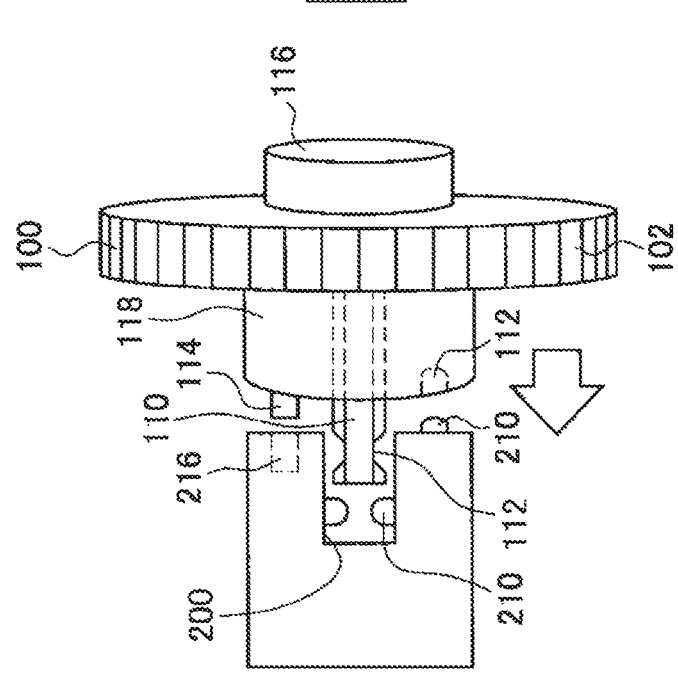
FIG.7

IMAGING DEVICE, IMAGING DEVICE CONTROL UNIT, AND IMAGING METHOD FOR ADJUSTING PARAMETERS OF IMAGING DEVICE

CROSS REFERENCE TO RELATED APPLICATIONS

This application is a U.S. National Phase of International Patent Application No. PCT/JP2018/029082 filed on Aug. 2, 2018, which claims priority benefit of Japanese Patent Application No. JP 2017-193964 filed in the Japan Patent Office on Oct. 4, 2017. Each of the above-referenced applications is hereby incorporated herein by reference in its entirety.

FIELD

The present disclosure relates to an imaging device, an imaging device control unit, and an imaging method.

BACKGROUND

In recent years, an imaging device such as a video camera that captures a moving image has become capable of capturing high-resolution images referred to as 4K and 8K. Furthermore, in recent years, an imaging element incorporated in the imaging device has become larger (larger size), and a depth of field becomes shallower than that of a conventional small imaging element. Thus, for example, it becomes possible to blur a background to capture an image so that a subject located in a foreground is visible. As such a technical innovation in the imaging device has progressed, it has become difficult for a user to manually and precisely adjust an imaging parameter of the imaging device, such as focus.

Therefore, Patent Literature 1 below discloses a drive unit capable of condensing (focusing) light from a subject on one point of a light receiving surface of an imaging element of an imaging device by performing a rotation operation on a lens ring of the imaging device to adjust a position of a lens. In the drive unit, by switching a relationship between rotation of the lens ring and the driving amount of the lens, it is possible to manually follow the subject promptly and adjust the focus.

In addition, Patent Literature 2 below discloses a focus demand unit which is connected to an imaging device (lens) for communication and corresponds to a separate device from the imaging device. The focus demand unit can detect a rotation angle of a rotation knob provided in the focus demand unit, transmit data of the detected rotation angle to the imaging device via a communication line, and drive a lens based on the rotation angle to perform focusing.

CITATION LIST

Patent Literature

Patent Literature 1: JP 2005-107424 A
Patent Literature 2: JP 2015-041026 A

SUMMARY

Technical Problem

However, according to a technology disclosed in Patent Literature 1, since the user directly touches the lens when operating the lens ring, vibration or impact caused by the operation of the user is directly transmitted to the lens, and focus may not be accurately and stably adjusted due to vibration or impact in some cases. In addition, a technology disclosed in Patent Literature 2 can be used only in an imaging device provided with a mechanism capable of communicating with the focus demand unit in advance (for example, a general serial communication protocol for broadcast use), such as a system camera used in a broadcasting station, etc. Therefore, a significant design change is required for an imaging device not having such a mechanism to use the focus demand unit. Further, a time lag from an operation of a rotation knob provided on the focus demand unit to adjustment of the focus occurs through the communication, and the lime lag makes it difficult to accurately and stably adjust the focus in some cases.

Therefore, the present disclosure proposes a new and improved imaging device, imaging device control unit, and imaging method capable of stably adjusting various parameters (focus, diaphragm (iris), zoom, etc.) of the imaging device without significantly changing the design of the imaging device.

Solution to Problem

According to the present disclosure, an imaging device is provided that includes: a rotating shaft insertion portion allowed to be attached to and detached from a housing, a rotating shaft having an operation member being inserted into the rotating shaft insertion portion; a rotation amount detector that detects a rotation amount of the rotating shaft; and a controller that controls a control target based on the rotation amount.

Moreover, according to the present disclosure, an imaging device control unit is provided that includes: a rotating shaft allowed to be attached to and detached from a housing, the rotating shaft having an operation member; a rotating shaft insertion portion into which the rotating shaft is inserted; a rotation amount detector that detects a rotation amount of the rotating shaft; and a terminal that outputs the rotation amount to the imaging device to control the imaging device.

Moreover, according to the present disclosure, an imaging method is provided that includes: detecting that a rotating shaft is inserted into a rotating shaft insertion portion provided in a housing of an imaging device; detecting a rotation amount of the rotating shaft rotated by an operation of a user; and controlling a control target based on the rotation amount.

Advantageous Effects of Invention

As described above, according to the present disclosure, it is possible to provide an imaging device, an imaging device control unit, and an imaging method capable of stably adjusting various parameters (focus, diaphragm (iris), zoom, etc.) of the imaging device without significantly changing the design of the imaging device.

Note that the above effects are not necessarily limited, and it is possible to obtain any of effects described in this specification or other effects that can be detected from this specification together with or instead of the above effects.

BRIEF DESCRIPTION OF DRAWINGS

FIG. 7 is an explanatory view schematically illustrating a detailed configuration of the operation knob 100 and the aperture 200 according to the same embodiment.

DESCRIPTION OF EMBODIMENTS

Figure 1:
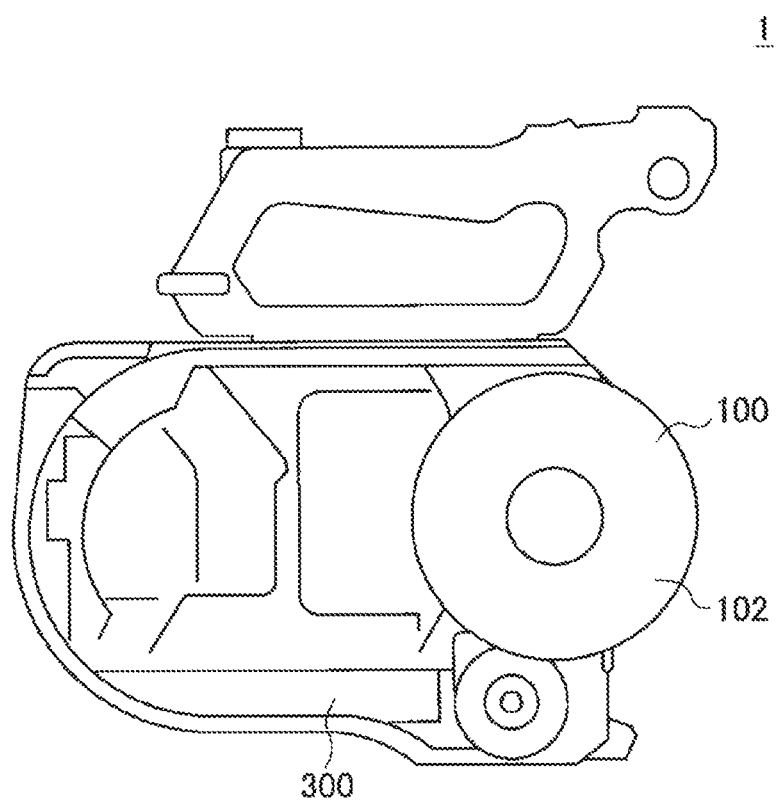
FIG. 1 is a side view of an imaging device 1 equipped with an operation knob 100 according to a first embodiment of the present disclosure.

Hereinafter, preferred embodiments of the present disclosure will be described in detail with reference to the accompanying drawings. In this specification and the drawings, components having substantially the same functional configuration are denoted by the same reference numerals, and redundant description is omitted.

In addition, in this specification and the drawings, a plurality of components having substantially the same or similar functional configuration may be distinguished from each other by the same reference numeral followed by different numerals. However, when it is unnecessary to particularly distinguish each of the plurality of components having substantially the same or similar functional configuration, only the same reference numeral is assigned. Further, similar components in different embodiments may be distinguished by adding different alphabets after the same reference numerals. However, when it is unnecessary to particularly distinguish each of similar components, only the same reference numeral is assigned.

The description will be made in the following order.
1. Background to creation of embodiments according to present disclosure by inventor
2. First Embodiment
2.1 With regard to detailed configuration of imaging device and operation knob
2.2 With regard to detailed configuration of operation knob, aperture, and periphery of aperture
2.3 With regard to imaging method
2.4 Modification
3. Second Embodiment
3.1 Detailed configuration of control unit 10
3.2 Modification
4. Third Embodiment
4.1 Imaging method
4.2 Modification
5. Application example
6. Summary
7. Supplement 1. Background to Creation of Embodiments According to Present Disclosure by Inventor First, before describing embodiments according to the present disclosure, a description will be given of a background to creation of the embodiments according to the present disclosure by the inventor.

As described above, in recent years, an imaging device has become capable of capturing high-resolution images referred to as 4K and 8K. Furthermore, in recent years, an imaging element incorporated in the imaging device has become larger (larger size), and a depth of field (focus range/depth) becomes shallower than that of a conventional small imaging element. Thus, for example, it becomes possible to blur a background to capture an image so that a subject located in a foreground is visible. That is, by using such an imaging device, a user can capture an image that matches the intention of the user.

However, as a technical innovation in such an imaging device has progressed, it has become difficult for the user to manually and precisely adjust an imaging parameter of the imaging device, such as focus. For example, in a broadcasting station that captures commercial images or a movie production site, it is common to manually adjust the focus, etc. to obtain an intended image. Therefore, the focus, etc. needs to be manually more precisely adjusted. In particular, in the case of attempting to acquire a high-resolution image having a small depth of field, since the focus range is narrow as described above, it is required to precisely adjust the focus.

In such an imaging device, the user adjusts the focus by rotating a lens ring attached to the lens. However, resolution of a rotation angle or the torque of the lens ring differs depending on the lens or the imaging device, and it is difficult to accurately perform operation and adjustment after understanding such a difference. In particular, when a lens such as a still lens is used in a lens-interchangeable video camera in which the lens can be exchanged, it becomes more difficult to adjust the focus. The still lens has a configuration in which a diameter of the lens ring is small and it is presumed that focusing performed by automatic control, that is, autofocus is performed. Therefore, in the case of such a lens, since the diameter of the lens ring is small and a ratio of a lens driving amount to a rotation amount of the lens ring becomes large, it is difficult to precisely adjust the focus by operating the lens ring. In addition, in the imaging device described above, since the user directly touches the lens when operating the lens ring, vibration or impact caused by the operation of the user is directly transmitted to the lens, and focus may not be accurately and stably adjusted due to vibration or impact in some cases.

In addition, in a video camera used in a broadcasting station that captures commercial images or a movie production site, an operation dial is provided on a main body in addition to the ring lens described above, and the user may be able to adjust the focus by operating the operation dial. However, such an operation dial is a dial having a small diameter presuming operation by a finger, and it is difficult to precisely adjust the focus by operating the dial.

In addition, in the case of being used at a site such as a broadcasting station that captures commercial images, the user may use a support jig for focus adjustment referred to as a follow focus to perform precise focus adjustment. The follow focus mainly includes a lens gear that meshes with the lens ring of the lens of the imaging device, another gear that meshes with the lens gear, a disc-shaped operation knob connected to the another gear, and a support rig for fixing these portions to the imaging device. When the user performs a rotation operation on the operation knob of the follow focus, the rotation by the operation is transmitted to the lens ring via the above-described gear, and the focus is adjusted by rotating the lens ring.

According to such a follow focus, by using an operation knob having a large diameter, even in a lens having a small system lens ring such as the above-mentioned still lens, it is possible to avoid an increase in the ratio of the lens driving amount to the rotation amount of the operation knob. As a result, the focus can be precisely and stably adjusted by the follow focus. Additionally, according to the follow focus, since the user does not directly touch the lens, vibration or impact caused by the operation of the user is not directly transmitted to the lens, and it is possible to avoid a situation in which focus may not be accurately and stably adjusted due to vibration or impact.

In addition, since an easily operated shape of the operation knob of the follow focus differs depending on the user, operation knobs having various shapes are prepared so that an optimally shaped operation knob can be selected according to a preference of the user, etc. Therefore, the user can select an operation knob having an optimum shape for the user, and use the selected operation knob by freely mounting the operation knob on the follow focus. In addition, in some cases, the user creates an operation knob having an optimal shape for the user. Further, some users write a scale on a surface of the operation knob so that the scale is used as a guide for the operation. That is, in the follow focus, since operation knobs of various shapes can be mounted and used according to the user, more precise focus adjustment can be stably performed.

However, the follow focus is basically fixed to the imaging device by the support rig, is large (specifically, has a large volume or weight), and has a complicated configuration. Therefore, when the follow focus is used, it is difficult to capture an image in a narrow place. In addition, when the follow focus is used, the weight becomes heavy, so that the mobility of the imaging device at the time of imaging deteriorates. Furthermore, in the follow focus, when the lens is replaced, the lens gear that meshes with the lens ring of the lens needs to be detached, so that it is difficult to suppress an increase in a time required for a lens replacement operation.

Further, Patent Literature 1 discloses a drive unit capable of adjusting the focus by performing a rotating operation on the lens ring as described above. In the drive unit, by switching a relationship between rotation of the lens ring and the driving amount of the lens, it is possible to follow the subject promptly and adjust the focus. However, according to a technology disclosed in Patent Literature 1, since the user directly touches the lens when operating the lens ring, vibration or impact caused by the operation of the user is directly transmitted to the lens, and focus may not be accurately and stably adjusted due to vibration or impact in some cases.

In addition, Patent Literature 2 described above discloses a focus demand unit which is connected to the imaging device for communication and corresponds to a separate device from the imaging device as described above. The focus demand unit can detect a rotation angle of a rotation knob provided in the focus demand unit, transmit data of the detected rotation angle to the imaging device via a communication line, and drive a lens based on the rotation angle to perform focusing. According to the technology disclosed in Patent Literature 2, unlike the technology disclosed in Patent Literature 1, the user does not directly touch the lens ring, so that the focus can be precisely adjusted. Further, according to the technology disclosed in Patent Literature 2, since a large and complicated configuration such as the follow focus described above is not mounted on the imaging device, it is possible to easily capture an image in a narrow place, and it is possible to ensure high mobility when an image is captured.

However, the technology disclosed in Patent Literature 2 can be used only in an imaging device provided with a mechanism capable of communicating with the focus demand unit in advance (for example, a general serial communication protocol for broadcast use), such as a system camera used in a broadcasting station, etc. Therefore, a significant design change is required for an imaging device not having such a mechanism to use the focus demand unit. Further, a time lag from an operation of a rotation knob provided on the focus demand unit to adjustment of the focus occurs through the communication, and the lime lag makes it difficult to accurately and stably adjust the focus in some cases.

Therefore, in view of such a situation, the inventor has created an imaging device, an imaging device control unit, an imaging device control operation knob, and an imaging method according to embodiments of the present disclosure. According to the embodiments of the present disclosure created by the inventor, it is possible to stably perform precise focus adjustment without significantly changing the design of the imaging device. Further, according to the embodiments of the present disclosure, since an optimal operation knob can be attached for each user, the focus can be adjusted more precisely. Additionally, according to the embodiments of the present disclosure, since the user can adjust the focus without directly touching the lens, vibration, etc. caused by the operation of the user is not directly transmitted to the lens, and it is possible to avoid a situation in which the focus may not be precisely adjusted due to vibration, etc. In addition, according to the embodiments of the present disclosure, since a large and complicated configuration such as the follow focus described above is not mounted on the imaging device, it is possible to easily capture an image in a narrow place, and it is possible to ensure high mobility when an image is captured. Further, according to the embodiments of the present disclosure, unlike the follow focus described above, there is no need to provide a lens gear that meshes with the lens ring. Therefore, there is no need to attach or detach the lens gear when the lens is replaced. Thus, the time required for the lens replacement operation does not increase. Hereinafter, such embodiments of the present disclosure will be successively described in detail.

In the embodiments of the present disclosure described below, the imaging device can drive various lenses, diaphragms, etc. by a signal from a controller provided in a main body of the imaging device. In other words, in the imaging device described below, focus, diaphragm (iris), zoom, etc. can be controlled automatically or manually. Further, in the following description, an example in which the invention is applied to adjustment of the focus of the imaging device will be described. However, the embodiments of the present disclosure are not limited thereto. The invention can be applied to adjustment of a diaphragm, zoom, etc. of an imaging device 1 similarly to the focus.

In the following description, adjusting the focus means moving the focus lens of the imaging device so that light from a subject is focused on one point of a light receiving surface of an imaging element of the imaging device.

Figure 2:
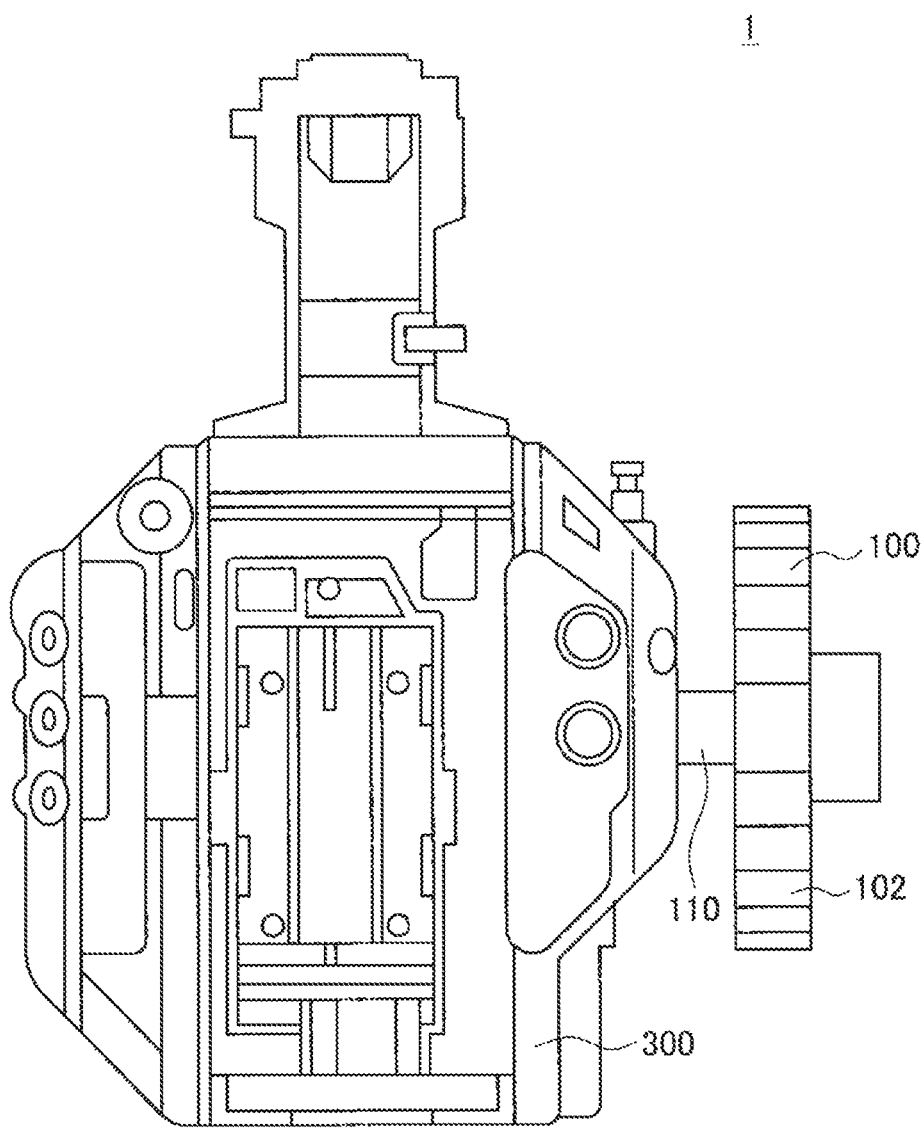
FIG. 2 is a rear view of the imaging device 1 equipped with the operation knob 100 according to the same embodiment.
Figure 3:
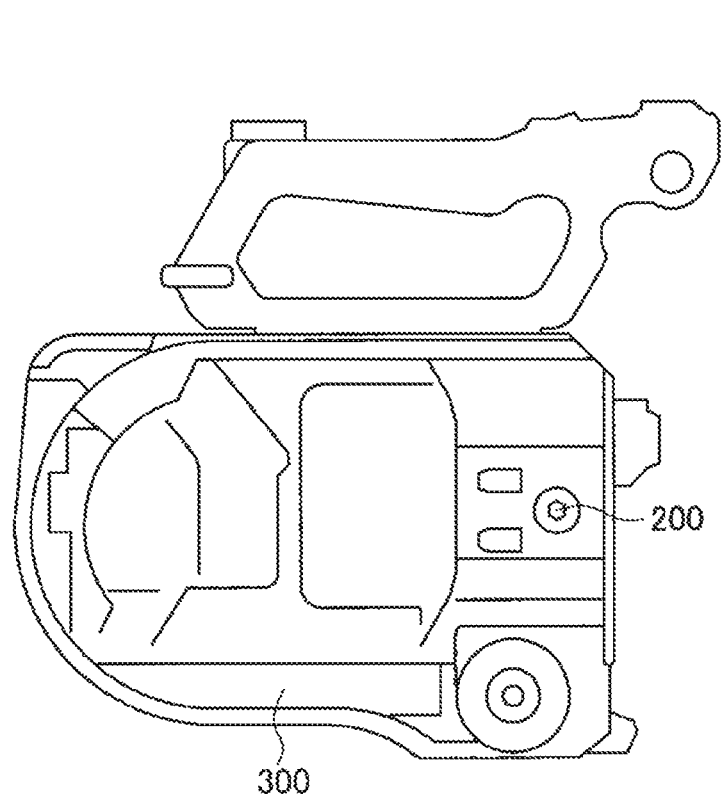
FIG. 3 is a side view of the imaging device 1 for description of a position of an aperture 200 at which the operation knob 100 is mounted according to the same embodiment.
Figure 4:
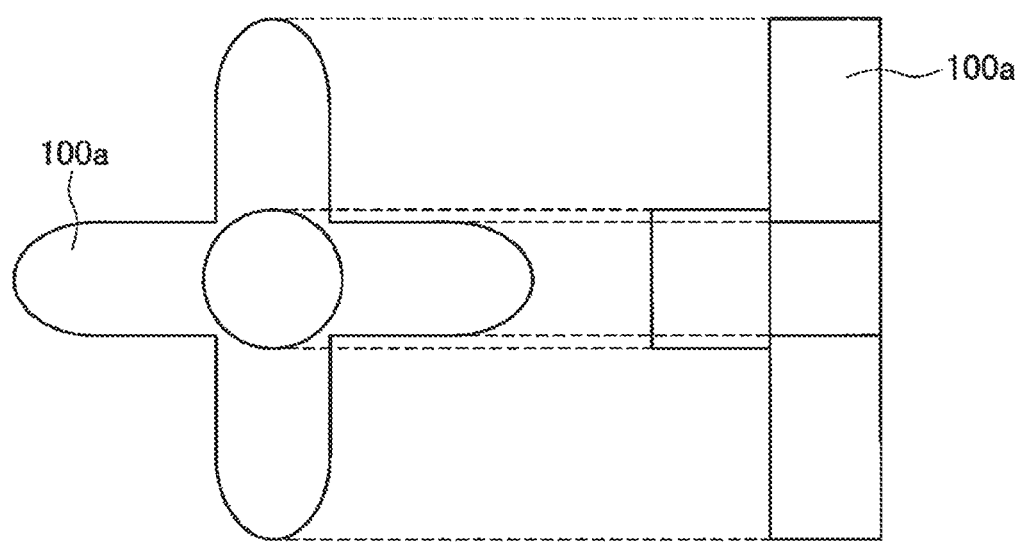
FIG. 4 is an explanatory view (part 1) for description of an operation knob 100a according to a modification of the same embodiment.

2. First Embodiment 2.1 with Regard to Detailed Configuration of Imaging Device and Operation Knob First, a detailed configuration of the imaging device 1 and an operation knob 100 according to a first embodiment of the present disclosure will be described with reference to FIG. 1 to FIG. 4. FIG. 1 is a side view of the imaging device 1 equipped with the operation knob (imaging device control knob) 100 according to the present embodiment, and FIG. 2 is a rear view of the imaging device 1 equipped with the operation knob according to the present embodiment. In addition, FIG. 3 is a side view of the imaging device 1 for description of a position of an aperture (rotating shaft insertion portion) 200 at which the operation knob 100 is mounted according to the present embodiment. Further, FIG. 4 is a block diagram of the imaging device 1 according to the present embodiment. In FIG. 1 to FIG. 3, only a housing 300 of the imaging device 1 is illustrated, and a lens unit 500 including various lenses (a fixed lens 540, a focus lens 544, and a zoom lens 546, see FIG. 3) and a diaphragm mechanism 542 (see FIG. 3) for capturing a subject is not illustrated. Note that the lens unit 500 is mounted on a front surface of the housing 300 of the imaging device 1 illustrated in FIG. 2. That is, in the following description, a side on which the lens unit 500 is mounted and which faces the subject is defined as a front surface of the imaging device 1, and a side located opposite to the front surface is defined as a rear surface of the imaging device 1.

The imaging device 1 according to the present embodiment is, for example, an imaging device that captures a moving image, and specifically is an imaging device such as a video camera used in a broadcasting station that captures commercial images or a movie production site. As illustrated in FIG. 1 and FIG. 2, the operation knob 100 can be mounted on the imaging device 1 according to the present embodiment. More specifically, the user can adjust the focus of the imaging device 1 by rotating the operation knob 100.

As illustrated in FIG. 1 and FIG. 2, the operation knob 100 mainly includes an operation member 102 having a disc-like shape, and a rotating shaft 110 connected to a center of the operation member. However, in the present embodiment, the operation knob 100 is not limited to the shape illustrated in the figure, and may have various shapes and sizes so as to be easily operated according to the user. For example, the operation knob 100 may include a rod-shaped lever (handle) operated by a user, and the rotating shaft 110 connected to the lever. Further, it is preferable that a notch, etc. functioning as a non-slip device is provided on a surface of the operation knob 100 so that a finger of the user does not slip during operation. In this way, the user can use the operation knob 100 having the optimal shape for the user, as the operation knob of the follow focus described above. Therefore, the operation knob 100 is not constantly fixed to the imaging device 1, and can be attached to the housing 300 of the imaging device 1 and detached from the housing 300. That is, in the present embodiment, since the operation knob 100 can be detachably attached to the housing 300 of the imaging device 1, it is possible to obtain an advantage that the operation knob 100 having the optimal shape for the user can be used, which is an advantage of the follow focus. As a result, according to the present embodiment, the focus can be more precisely and stably adjusted.

In addition, for example, as illustrated in FIG. 3, the operation knob 100 can be attached to the imaging device 1 by inserting the rotating shaft 110 of the operation knob 100 into an aperture 200 provided on a side surface of the imaging device 1. The aperture 200 according to the present embodiment may not be provided on the side surface of the imaging device 1 as illustrated in FIG. 3. For example, according to a desire of the user, the aperture 200 may be provided on an upper surface or a rear surface (a surface on an opposite side from a side on which the lens unit 500 is mounted) of the housing 300 of the imaging device 1, and is not particularly limited. In addition, in FIG. 3, the aperture 200 is illustrated as a hexagonal hole. However, in the present embodiment, the aperture 200 is not limited thereto, and may correspond to, for example, a circular hole. In addition, a cross section of the rotating shaft 110 of the operation knob 100 has a shape corresponding to the shape of the aperture 200. Therefore, the cross section of the rotating shaft 110 corresponding to the aperture 200 of FIG. 3 has a hexagonal shape. However, as described above, the cross section of the rotating shaft 110 is not limited to the hexagonal shape, and may be any shape corresponding to the shape of the aperture 200.

Figure 5:
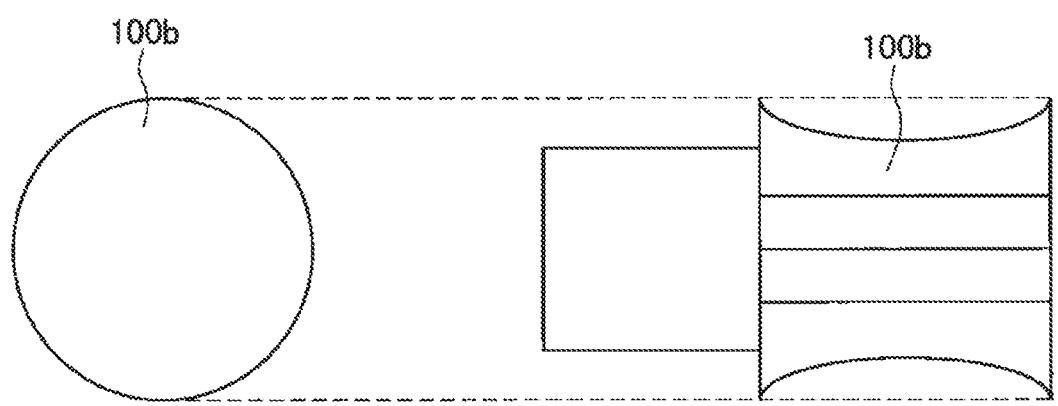
FIG. 5 is an explanatory view (part 2) for description of an operation knob 100b according to a modification of the same embodiment.

Further, another embodiment of the operation knob 100 will be described with reference to FIG. 4 and FIG. 5. FIG. 4 and FIG. 5 are explanatory views for description of operation knobs 100a and 100b according to modifications of the present embodiment. Specifically, in FIG. 4 and FIG. 5, on the left side, in a state where the operation knobs 100a and 100b are attached to the imaging device 1, a figure of the case where the operation knobs 100a and 100b are viewed from a side surface side of the imaging device 1 is illustrated, and a figure of the case where the operation knobs 100a and 100b are viewed from a rear surface side of the imaging device 1 is illustrated.

For example, the operation knob 100a illustrated in FIG. 4 has a substantially cross shape so that the user can easily grip the operation knob 100a. Therefore, according to the modification illustrated in FIG. 4, the user can firmly hold the operation knob 100a to perform the operation. In addition, the operation knob 100b illustrated in FIG. 5 has a substantially columnar adjustment knob so that the user can pinch and operate the operation knob 100b with fingertips. Specifically, as illustrated in FIG. 5, the adjustment knob has a shape in which an outer peripheral surface is curved inward and fingers of the user are more easily fit to the adjustment knob. Since the operation knob 100b of FIG. 5 can be operated by being pinched with fingertips, the focus, etc. of the imaging device 1 can be easily finely adjusted. Note that it is preferable that a notch, etc. functioning as a non-slip device is provided on each of surfaces of the operation knobs 100a and 100b so that a finger of the user does not slip during operation as described above.

In the above description, the substantially cross shape and the substantially columnar shape not only means the cases of a cross shape and a columnar shape in a geometrical sense, but also means that shapes similar to the shapes are included.

Figure 6:
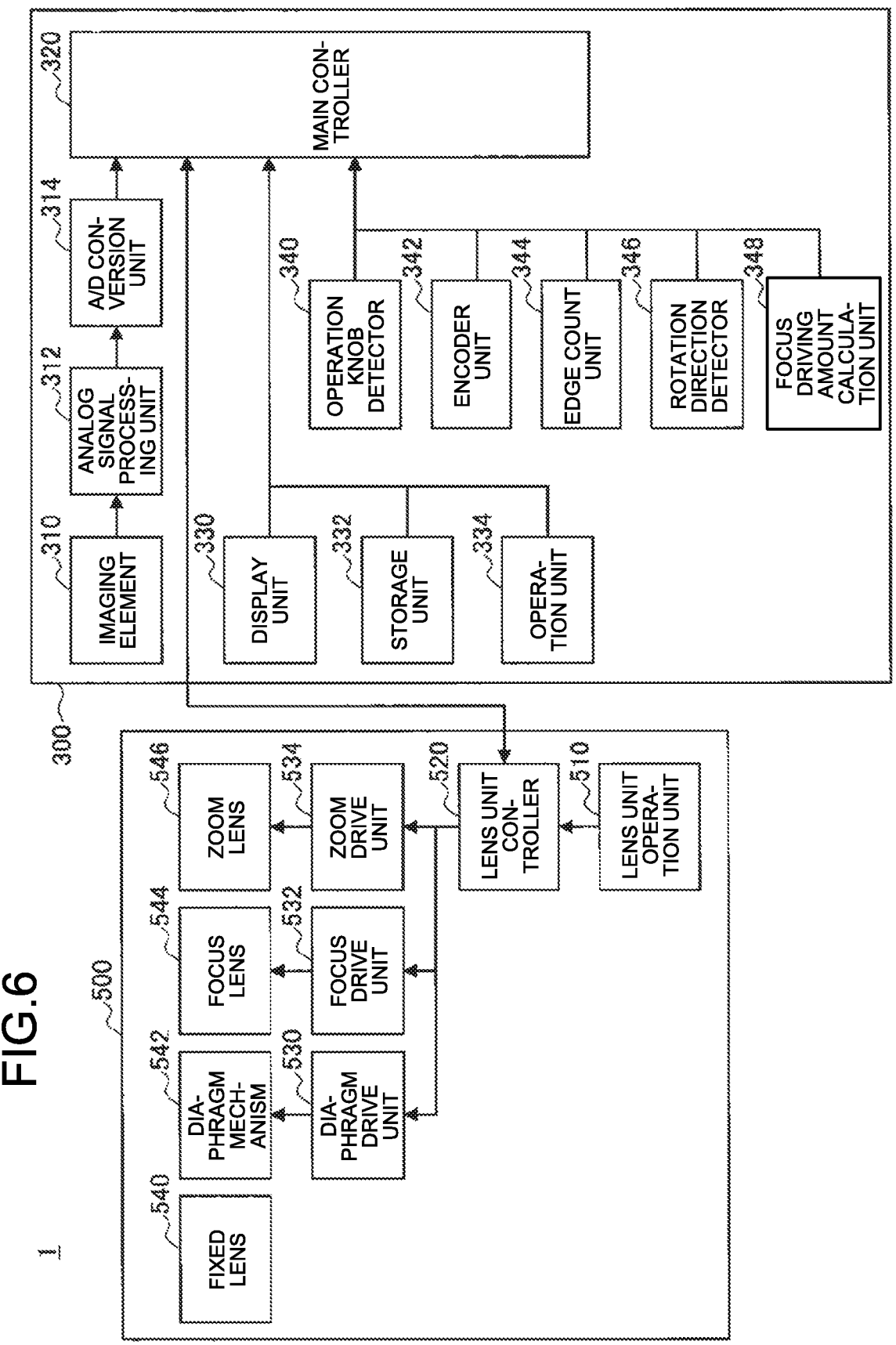
FIG. 6 is a block diagram of an imaging device 1 according to the same embodiment.

Next, each unit of the imaging device 1 will be described with reference to FIG. 6. The imaging device 1 mainly has two units, the housing 300 and the lens unit 500. First, a detailed configuration of the housing 300 of the imaging device 1 will be described. As illustrated in FIG. 6, the housing 300 includes an imaging element 310, an analog signal processing unit 312, an analog digital (A/D) conversion unit 314, a main controller 320, a display unit 330, a storage unit 332, and an operation unit 334. Further, the housing 300 includes an operation knob detector 340, an encoder unit 342, an edge count unit (rotation amount detector) 344, a rotation direction detector 346, and a focus driving amount calculation unit 348. Hereinafter, respective blocks provided in the housing 300 will be successively described.

(Imaging Element 310)

The imaging element 310 forms an optical image of incident light from a target (subject) on a light receiving surface thereof using various lenses provided in the lens unit 500. The imaging element 310 is implemented by, for example, a charge coupled device (CCD) sensor array, a complementary metal oxide semiconductor (CMOS) sensor array, etc. The imaging element 310 photoelectrically converts the formed optical image in pixel units, and outputs an obtained signal of each pixel to the analog signal processing unit 312 described later as an imaging signal.

In the present embodiment, the imaging element 310 may include at least a pair of image plane phase difference detection pixels (not illustrated). Specifically, the image plane phase difference detection pixels are formed so that the sensitivity is asymmetric with respect to an incident angle of light. Further, since the pair of image plane phase difference detection pixels has asymmetry in which the sensitivity differs with respect to the incident angle of light, a detected image is shifted. Therefore, by detecting a phase difference (image shift) using the pair of image plane phase difference detection pixels, it is possible to calculate a defocus amount (a defocus amount indicating a degree of shift based on a state where the subject is in focus). For example, the autofocus function of the imaging device 1 can be realized using a detection result of such image plane phase difference detection pixels.

(Analog Signal Processing Unit 312)

The analog signal processing unit 312 performs signal processing such as gamma correction or white balance on the imaging signal from the imaging element 310, and outputs the imaging signal subjected to signal processing to the A/D conversion unit 314 described later. The analog signal processing unit 312 is implemented by, for example, an electronic circuit.

(A/D Conversion Unit 314)

The A/D conversion unit 314 converts the imaging signal from the analog signal processing unit 312 from an analog signal to a digital signal, and outputs the converted imaging signal to the main controller 320 described later. The digital signal obtained by the A/D conversion unit 314 can be used when displaying a captured image on the display unit 330 described later, or can be stored in the storage unit 332 described later. The A/D conversion unit 314 is implemented by, for example, an electronic circuit.

(Main Controller 320)

The main controller 320 is provided in the housing 300, and can control each block and the lens unit 500 in the housing 300. For example, the main controller 320 is implemented by hardware such as a central processing unit (CPU), a read only memory (ROM), a random access memory (RAM), etc. Specifically, the main controller 320 controls each block of the imaging device 1 based on an input from the operation unit 334 described later or based on a control program stored in the storage unit 332. For example, the main controller 320 performs a predetermined process on the digital signal from the A/D conversion unit 314, and causes the display unit 330 described later to display the captured image using data obtained by the process. Further, main controller 320 causes storage unit 332 to store data obtained by the process. In addition, the main controller 320 can adjust focus, diaphragm, zoom, electronic zoom, etc. by controlling various lenses (the focus lens 544 and the zoom lens 546), etc. included in the lens unit 500.

(Display Unit 330)

The display unit 330 functions as a display device of the imaging device 1, and displays a captured image based on a digital signal output from the main controller 320, for example. The display unit 330 is implemented by a liquid crystal display (LCD) device or an organic light emitting diode (OLED) device. In addition, in the present embodiment, the display unit 330 may be provided as a unit integrated with the operation unit 334 described below. In this case, the operation unit 334 is implemented by, for example, a touch panel superimposed on the display unit 330.

(Storage Unit 332)

The storage unit 332 stores a program used for processing of the main controller 320 and a digital signal from the main controller 320. For example, the storage unit 332 includes a storage medium such as an integrated circuit (IC) memory card, a RAM, etc. For example, the storage unit 332 can store one or a plurality of pieces of relationship information (for example, a conversion curve) that determines a relationship between a rotation amount (rotation angle) of the rotating shaft 110 and a driving amount of the focus lens 544 described later in advance. The relationship information is used when the driving amount of the focus lens 544 is calculated by the focus driving amount calculation unit 348 described later.

(Operation Unit 334)

The operation unit 334 includes, for example, various buttons, switches, dials, etc. provided on the housing 300, and detects an input operation by the user on a button. The input operation detected by the operation unit 334 is output to the main controller 320, and the main controller 320 controls each block of the imaging device 1 based on the output. Further, as described above, the operation unit 334 may correspond to a touch panel provided to be superimposed on the display unit 330.

(Operation Knob Detector 340)

The operation knob detector (insertion detector) 340 detects that the rotating shaft 110 connected to the operation knob 100 is inserted into the aperture 200 provided in the housing 300. The operation knob detector 340 has, for example, a switch 210 provided inside and around the aperture 200, and is an electric sensor capable of detecting that the rotating shaft 110 is inserted by pressing down the switch 210. However, in the present embodiment, detection of the insertion of the rotating shaft 110 by the operation knob detector 340 is not limited to detection by the above-described electric sensor. For example, the detection may be performed by an optical sensor including a pair of a light emitting sensor (not illustrated) and a light receiving sensor (not illustrated). In this case, light from the light receiving sensor is blocked by the rotating shaft 110 and the light receiving sensor may not detect the light, so that insertion of the rotating shaft 110 can be detected. Further, the detection may be performed using a magnetic sensor.

In addition, the rotating shaft 110 detected to be inserted in this way is engaged with a gear 212 provided at a back of the aperture 200 of the housing 300. When the rotating shaft 110 is rotated by a user operation, the gear 212 rotates according to the rotation of the rotating shaft 110. Further, the rotation of the gear 212 is transmitted to the encoder unit 342 described below via another gear 214, and the encoder unit rotates. Details of a mechanism from the rotating shaft 110 to the encoder unit 342 will be described later.

(Encoder Unit 342)

The encoder unit 342 rotates according to the rotation of the rotating shaft 110 as described above, and outputs two rectangular signals to the edge count unit 344 and the rotation direction detector 346 described below. The encoder unit 342 can be implemented by, for example, a rotary encoder. Details of output of the rectangular signals by the encoder unit 342 will be described later.

(Edge Count Unit 344)

The edge count unit 344 counts the number of edges of a rectangular signal output from the encoder unit 342, and detects a rotation amount (rotation angle) of the rotating shaft 110. Specifically, the edge count unit 344 counts the number of rising edges, the number of falling edges, or both the numbers of the rectangular signal, and outputs the counted number to the focus driving amount calculation unit 348 described later. In the following description, the rising and falling edges of the rectangular signal are collectively referred to as edges. For example, the edge count unit 344 is implemented by hardware such as a CPU, a ROM, etc.

(Rotation Direction Detector 346)

The rotation direction detector 346 detects a rotation direction (clockwise or counterclockwise) of the encoder unit 342, that is, a rotation direction of the rotating shaft 110, from a phase relationship between the two rectangular signals output from the encoder unit 342, and outputs a detection result to the focus driving amount calculation unit 348. For example, the rotation direction detector 346 is implemented by hardware such as a CPU, a ROM, etc.

(Focus Driving Amount Calculation Unit 348)

The focus driving amount calculation unit 348 calculates a driving amount of the focus lens 544 described later based on the rotation direction detected by the rotation direction detector 346 and the number of edges counted by the edge count unit 344. Specifically, the focus driving amount calculation unit 348 calculates the driving amount with reference to relationship information (for example, a conversion curve) that determines the relationship between the number of edges (rotation amount) and the driving amount in advance. Alternatively, the focus driving amount calculation unit 348 may calculate the driving amount with reference to a conversion table in which a relationship between the preset number of edges and the driving amount is defined. The calculated driving amount is output to main controller 320, and further output from main controller 320 to the lens unit controller 520 of the lens unit 500. For example, the focus driving amount calculation unit 348 is implemented by hardware such as a CPU, a ROM, etc.

The conversion curve used when the driving amount is calculated can be displayed on the display unit 330 in the form of a graph illustrating the relationship between the number of edges (the rotation amount) and the driving amount. In this case, the user can appropriately adjust a slope of the conversion curve by performing an operation on the displayed graph. Further, a plurality of conversion curves or conversion tables may be stored in the storage unit 332. In this case, by operating the operation unit 334, the user may select a conversion curve or a conversion table used when the driving amount is calculated. In the above description, the focus driving amount calculation unit 348 is described as calculating the driving amount for controlling the focus. However, the invention is not limited thereto in the present embodiment, and the focus driving amount calculation unit 348 may calculate another driving amount for controlling various parameters (diaphragm (iris), zoom (including electronic zoom), etc.) of the imaging device 1.

Next, a detailed configuration of the lens unit 500 will be described. As illustrated in FIG. 6, the lens unit 500 includes a lens unit operation unit 510, a lens unit controller (drive mechanism controller) 520, a diaphragm drive unit 530, a focus drive unit 532, and a zoom drive unit 534. Further, the lens unit 500 includes a fixed lens 540, a diaphragm mechanism 542, a focus lens 544, and a zoom lens 546. Hereinafter, respective blocks provided in the lens unit 500 will be successively described.

(Lens Unit Operation Unit 510)

When the lens unit operation unit 510 is operated by the user, the lens unit operation unit 510 outputs a pulse signal corresponding to the operation to the lens unit controller 520 described later. The lens unit operation unit 510 is implemented by, for example, various buttons, switches, dials, etc. provided on the lens unit 500, and the lens ring.

(Lens Unit Controller 520)

The lens unit controller 520 controls the diaphragm drive unit 530, the focus drive unit 532, and the zoom drive unit 534 described later based on a pulse signal output from the lens unit operation unit 510 or a signal (for example, a driving amount) output from the main controller 320 of the housing 300. For example, the lens unit controller 520 is implemented by hardware such as a CPU, a ROM, etc.

(Diaphragm Drive Unit 530)

The diaphragm adjusts the amount of light incident on the imaging element 310, and the diaphragm drive unit 530 drives the diaphragm mechanism 542 described later to adjust the amount of light. The diaphragm drive unit 530 is implemented by, for example, a stepping motor.

(Focus Drive Unit 532)

The focus drive unit 532 is a mechanism for performing focus adjustment by moving the focus lens 544 described later along an optical axis direction, and is implemented by, for example, a stepping motor.

(Zoom Drive Unit 534)

The zoom drive unit 534 is a mechanism that controls a zoom ratio by moving the zoom lens 546 described later along the optical axis direction, and is implemented by, for example, a stepping motor.

(Fixed Lens 540)

The fixed lens 540 is a lens fixed to a lens barrel (not illustrated) provided in the lens unit 500, and is implemented by, for example, a concave lens, etc.

(Diaphragm Mechanism 542)

The diaphragm mechanism 542 has, for example, a plurality of diaphragm blades movably provided to surround an optical path of the imaging element 310. When the diaphragm blades of the diaphragm mechanism 542 move, an aperture diameter outline-defined by the diaphragm blades is enlarged and reduced, and the amount of light incident on the imaging element 310 is adjusted.

(Focus Lens 544)

As described above, the focus lens 544 can perform focusing by being moved in the optical axis direction by the focus drive unit 532. The focus lens 544 is implemented by, for example, one or a plurality of convex lenses and concave lenses.

(Zoom Lens 546)

As described above, the zoom lens 546 can change the zoom ratio by being moved in the optical axis direction by the zoom drive unit 534. The zoom lens 546 is implemented by, for example, one or a plurality of convex lenses and concave lenses.

Figure 8:
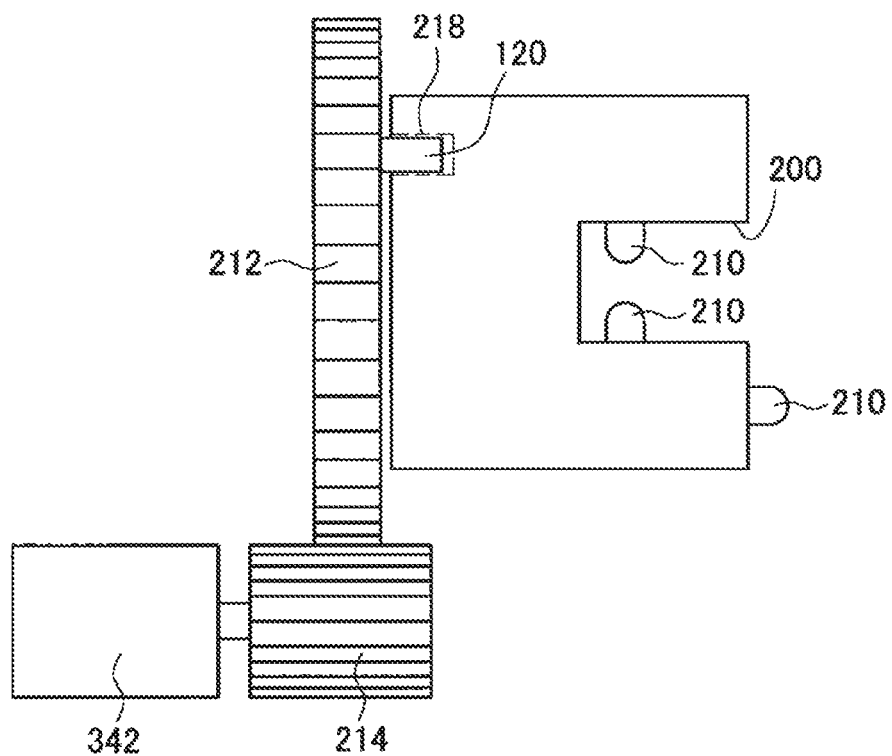
FIG. 8 is an explanatory view schematically illustrating a detailed configuration around the aperture 200 according to the same embodiment.

2.2 With Regard to Detailed Configuration of Operation Knob, Aperture, and Periphery of Aperture Next, a detailed configuration of the operation knob 100, the aperture 200, and a periphery of the aperture 200 according to the present embodiment will be described with reference to FIG. 7 and FIG. 8. FIG. 7 is an explanatory view schematically illustrating the detailed configuration of the operation knob 100 and the aperture 200 according to the present embodiment. In detail, a diagram on the left side of FIG. 7 illustrates the operation knob 100 immediately before being mounted on the aperture 200, and the operation knob 100 mounted on the aperture 200 is illustrated on the right side of FIG. 7. In addition, FIG. 8 is an explanatory view schematically illustrating the detailed configuration around the aperture 200 according to the present embodiment.

As described above, the user can adjust the focus of the imaging device 1 by rotating the operation knob 100. In addition, the operation knob 100 is not constantly fixed to the imaging device 1, and can be attached to the housing 300 of the imaging device 1 and detached from the housing 300.

In detail, the operation knob 100 has the disc-shaped operation member 102 as illustrated on the left side of FIG. 7. As described above, when the user rotates the operation member 102, the hexagonal column-shaped rotating shaft 110 connected to the center of the operation member 102 rotates. As illustrated on the left side of FIG. 7, on a front side (opposite side from the aperture 200) of the disc-shaped operation member 102, a head 116 connected to a distal end of the rotating shaft 110 is provided. On the other hand, on a rear side (aperture 200 side) of the operation member 102, a pedestal 118 through which the rotating shaft 110 passes centrally is provided. Further, a protrusion-shaped screw 114 is provided on the aperture 200 side of the pedestal 118, and the screw 114 is used when the operation knob 100 is fixed to the housing 300 of the imaging device 1. In addition, an engagement groove 112 that engages with the switch 210 provided around the aperture 200 may be provided on the aperture 200 side of the pedestal 118.

Further, as illustrated on the left side of FIG. 7, the engagement groove 112 is provided along a circumference of the rotating shaft 110 on a peripheral surface of the rotating shaft 110 on the aperture 200 side, and the engagement groove 112 engages with the protrusion-shaped switch 210 provided inside the aperture 200. In the present embodiment, the number and positions of the switches 210 provided inside the aperture 200 are not particularly limited. For example, two or four switches 210 may be provided inside the aperture 200 so that the rotating shaft 110 inserted into the aperture 200 is interposed from above and below and/or from left and right.

Then, as illustrated on the left side of FIG. 7, the user attaches the operation knob 100 to the housing 300 of the imaging device 1, that is, inserts the rotating shaft 110 into the aperture 200 of the housing 300. In this way, the switch 210 provided around the aperture 200 engages with the engagement groove 112 provided in the pedestal 118, and further, the switch 210 provided inside the aperture 200 engages with the engagement groove 112 provided on the rotating shaft 110. Then, when the switch 210 engages with the engagement groove 112, the switch 210 is pressed against a bottom surface of the engagement groove 112, and an electrical state of the switch 210 changes (for example, by being pressed, the switch 210 is connected to the ground and the potential becomes 0). Further, when the operation knob detector 340 described above detects such a change in the electrical state of the switch 210, it is possible to detect the attachment of the operation knob 100, that is, the insertion of the rotating shaft 110 into the aperture 200. Since the switch 210 and the engagement groove 112 are engaged with each other as described above, the switch 210 and the engagement groove 112 can have a function of fixing the operation knob 100 to the housing 300 of the imaging device 1.

Further, as illustrated in FIG. 7, around the aperture 200, a screw hole (engagement member) 216 for fixing the operation knob 100 may be provided. The user may fix the operation knob 100 to the housing 300 of the imaging device 1 by engaging the screw hole 216 with a screw (engagement member) 114 provided on the aperture 200 side of the pedestal 118 described above. In this way, the operation knob 100 can be reliably fixed to the imaging device 1.

In addition, at the back of the aperture 200 of the housing 300, as illustrated in FIG. 8, the gear 212 is provided to rotate by being engaged with the rotating shaft 110. Further, at an end of the gear 212, another gear 214 that engages with the gear 212 is provided, and further, the encoder unit 342 is provided to be connected to the gear 214. Therefore, when the rotating shaft 110 is rotated by an operation of the user, the rotation of the rotating shaft 110 is transmitted, the gear 212 rotates. Further, the rotation of the gear 212 causes the gear 214 to rotate, and the rotation of the gear 214 causes the encoder unit 342 to rotate. That is, the rotation of the rotating shaft 110 is transmitted to the encoder unit 342 via the gears 212 and 214.

Further, the encoder unit 342 includes, for example, the rotary encoder as described above. In this case, the encoder unit 342 includes a rotating plate (not illustrated) that rotates according to the rotation of the rotating shaft 110, two slits (not illustrated) provided on the rotating plate, and two pairs of light receiving/emitting elements (not illustrated) provided to interpose the rotating plate therebetween. In the encoder unit 342, when the rotating plate rotates according to the rotation of the rotating shaft 110, light emitted by the light emitting element located on one side of the rotating plate may or may not be received by the light receiving element located on the other side of the rotating plate. Specifically, the light emitted by the light emitting element may not be received by the light receiving element when the light is blocked by the rotating plate, and may be received by the light receiving element when the light can pass through the slit. When the rotating plate rotates in this way, light emitted from the light emitting element toward the light receiving element is blocked or received through the slit. Thus, in the encoder unit 342, two rectangular signals can be obtained by converting the light received by the light receiving element into an electric signal. Note that the two slits are provided in the rotating plate so that phases of the two rectangular signals are shifted by ¼ cycle, for example, and such two rectangular signals having shifted phases are referred to as an A-phase signal and a B-phase signal. Therefore, by counting the rising edges and falling edges (edges) of the rectangular signals output from the encoder unit 342, it is possible to detect the rotation amount of the encoder unit 342, that is, the rotation amount of the rotating shaft 110. In addition, a phase relationship between the A-phase signal and the B-phase signal is inverted according to the rotation direction. Thus, by detecting the phase relationship between the A-phase signal and the B-phase signal, a rotation direction of the encoder unit 342, that is, a rotation direction of the rotating shaft 110 can be detected.

As illustrated in FIG. 8, the gear 212 may be fixed to the aperture 200 by engaging a screw 120 provided on the gear 212 with a screw hole 218 provided on the gear 212 side of the aperture 200.

As described above, even though the imaging device 1 according to the present embodiment is provided with the aperture 200, the encoder unit 342, etc. in the housing 300, the imaging device 1 can use a conventionally provided control block (the main controller 320, etc.) without change. Thus, it is possible to avoid a drastic change in the design of the imaging device 1. In addition, according to the present embodiment, since the user adjusts the focus by operating the operation knob 100, vibration, etc. caused by the operation of the user is not directly transmitted to the lens, and it is possible to avoid a situation in which the focus may not be precisely adjusted due to vibration, etc. In addition, according to the present embodiment, since a large and complicated configuration such as the follow focus described above is not mounted on the imaging device 1, it is possible to easily capture an image in a narrow place. Additionally it is possible to ensure high mobility when an image is captured. Further, according to the present embodiment, unlike the follow focus described above, there is no need to provide a lens gear that meshes with the lens ring. Therefore, there is no need to attach or detach the lens gear when the lens is replaced. Thus, the time required for the lens replacement operation does not increase.

2.3 Imaging Method

Figure 9:
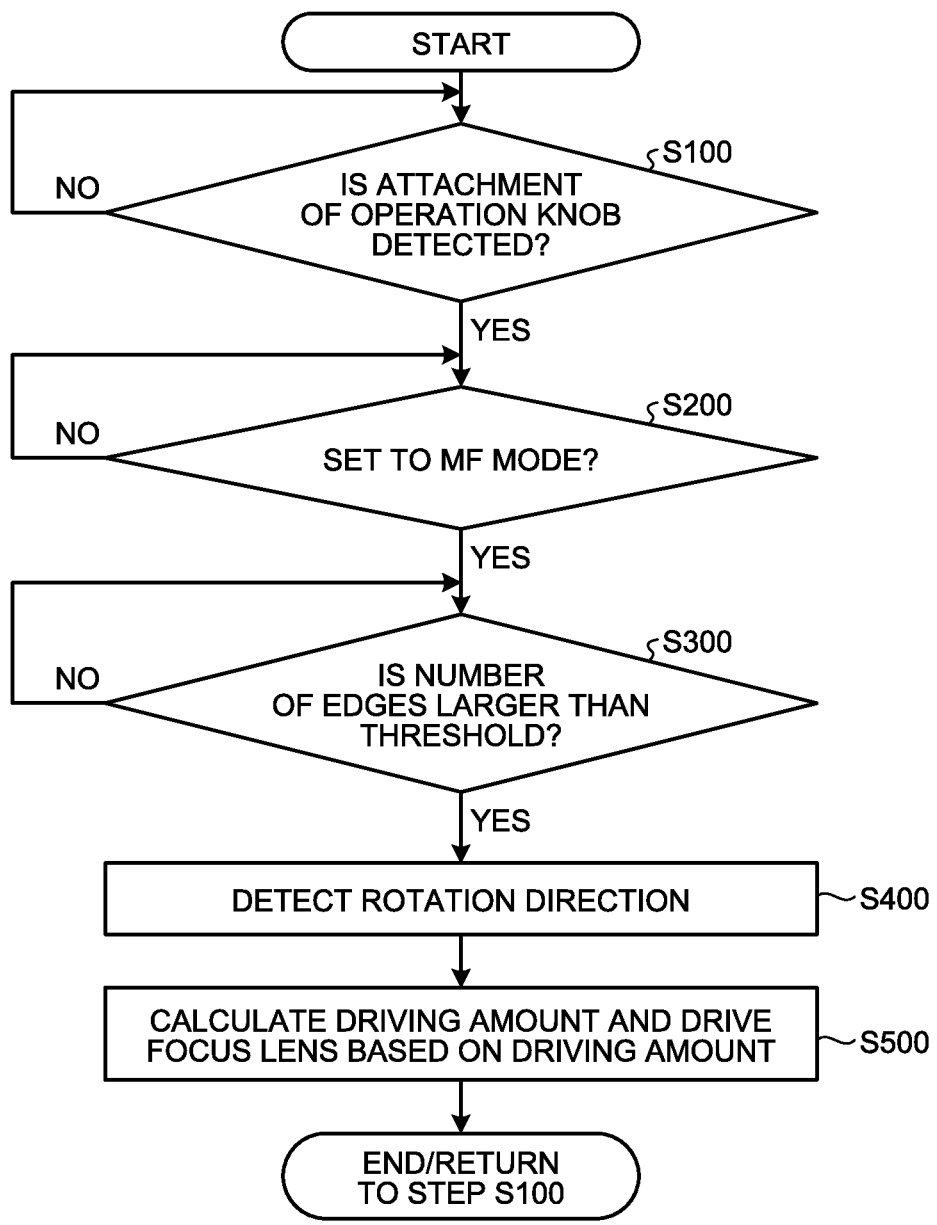
FIG. 9 is a flowchart of an imaging method according to the same embodiment.
Figure 10:
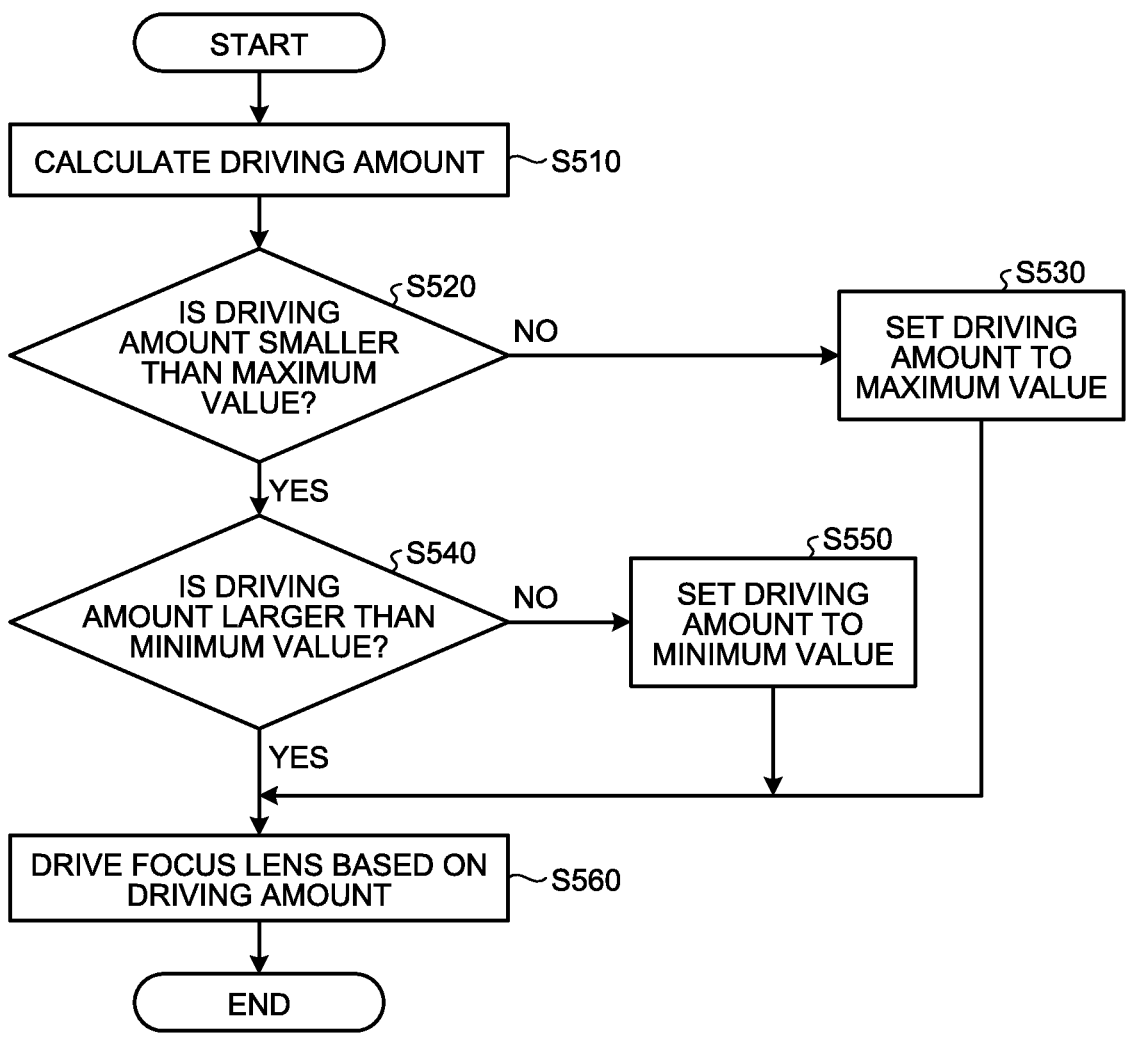
FIG. 10 is a flowchart of steps included in Step S500 of FIG. 7.
Figure 11:
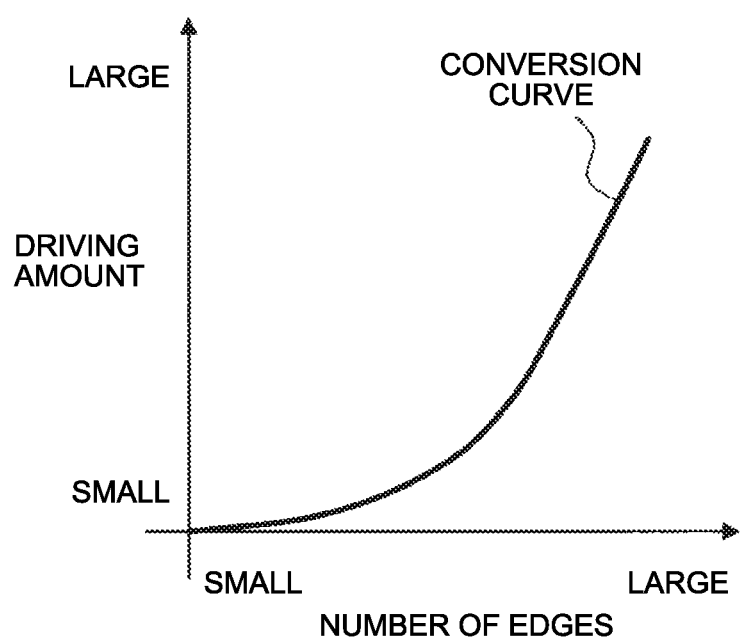
FIG. 11 is an explanatory view illustrating an example of a conversion curve according to the same embodiment.

The detailed configuration of the operation knob 100, the aperture 200, and the periphery of the aperture 200 according to the first embodiment of the present disclosure has been described. Next, an imaging method according to the present embodiment will be described with reference to FIG. 9 to FIG. 11. FIG. 9 is a flowchart of the imaging method according to the present embodiment, and FIG. 10 is a flowchart of steps included in Step S500 of FIG. 9. Further, FIG. 11 is an explanatory view illustrating an example of a conversion curve according to the present embodiment.

A general flow of the imaging method according to the present embodiment will be described. First, the imaging method detects that the operation knob 100 is attached to the housing 300 of the imaging device 1, that is, the rotating shaft 110 of the operation knob 100 is inserted into the aperture 200 of the housing 300. Subsequently, the imaging method detects the rotation amount of the rotating shaft 110 rotated by the user operation, calculates the driving amount of the focus lens 544 based on the rotation amount, and drives the focus lens 544 based on the calculated driving amount. Specifically, as illustrated in FIG. 9, the imaging method according to the present embodiment includes a plurality of steps from Step S100 to Step S500. Hereinafter, details of each step of the imaging method according to the present embodiment will be described.

(Step S100)

The imaging device 1 detects attachment of the operation knob 100 based on whether or not the rotating shaft 110 of the operation knob 100 is inserted into the aperture 200 of the housing 300 and the switch 210 is pushed up. When the attachment of the operation knob 100 is detected, the process proceeds to Step S200. When the attachment of the operation knob 100 is not detected, Step S100 is repeated.

(Step S200)

The imaging device 1 verifies whether setting of the housing 300 is set to a manual focus (MF) mode. Here, the MF mode refers to a mode in which the user can manually set the focus. In the case of not being set to the MF mode, the imaging device 1 is set to an autofocus (AF) mode, that is, a mode in which the imaging device 1 can automatically control the focus. When the imaging device 1 is set to the MF mode, the process proceeds to Step S300. When the imaging device 1 is set to the AF mode, Step S200 is repeated.

(Step S300)

The imaging device 1 measures the rotation amount, that is, starts counting the number of edges of the rectangular signal output from the encoder unit 342. When the number of edges is larger than a predetermined threshold, it is presumed that the user intentionally operates the operation knob 100, the number of edges is acquired, and the process proceeds to Step S400. On the other hand, when the number of edges is smaller than the predetermined threshold, it is presumed that the user does not intentionally operate the operation knob 100, and Step S300 is repeated. Counting of the number of edges may correspond to counting of any one of the number of rising edges, the number of falling edges, or both the numbers of the rectangular signal.

(Step S400)

The imaging device 1 detects the rotation direction of the rotating shaft 110 from the phase relationship between the A-phase signal and the B-phase signal output from the encoder unit 342. Note that the definition of the rotation direction of the rotating shaft 110 can be set by the user inputting to the imaging device 1 in advance.

(Step S500)

The imaging device 1 calculates the driving amount of the focus lens 544 based on the number of edges acquired in Step S300, that is, the rotation amount and the rotation direction acquired in Step S400. Further, the imaging device 1 controls the focus drive unit 532 based on the calculated driving amount to drive the focus lens 544. Further, the imaging device 1 ends the imaging method according to the present embodiment in the case of receiving an operation by the user to end the start of the imaging device 1, and returns to Step S100 described above in the case of not receiving the operation. Details of Step S500 will be described below.

Next, details of Step S500, that is, details of calculation of the driving amount will be described with reference to FIG. 10 and FIG. 11. As illustrated in FIG. 10, Step S500 includes a plurality of steps from Step S510 to Step S560. Details of each of these steps will be described below.

(Step S510)

The imaging device 1 calculates the driving amount of the focus lens 544 based on the number of edges acquired in Step S300 and the rotation direction acquired in Step S400. In this instance, for example, the imaging device 1 calculates the driving amount of the focus lens 544 with reference to a conversion curve indicating a preset relationship between the number of edges and the driving amount illustrated in FIG. 11. That is, the imaging device 1 can calculate the corresponding driving amount by plotting the acquired number of edges on the conversion curve. In the present embodiment, the invention is not limited to calculating the driving amount of the focus lens 544 with reference to the conversion curve, and the driving amount of the focus lens 544 may be calculated with reference to a conversion table in which the preset relationship between the number of edges and the driving amount is defined.

As described above, the conversion curve of FIG. 12 may be displayed on the display unit 330 of the imaging device 1. In this case, the user may perform an operation on the displayed graph to appropriately adjust a slope of the conversion curve. For example, the user can set the slope of the conversion curve to a steep slope so that the focus lens 544 is promptly driven even when the rotation amount of the operation knob 100 is small. On the other hand, the user can set the slope of the conversion curve to a gentle slope so that the focus lens 544 is not largely driven even when the rotation amount of the operation knob 100 is large. By making such settings, it becomes easy to finely adjust the focus by rotating the operation knob 100. That is, in the present embodiment, the user can adjust the slope of the conversion curve, thereby appropriately changing the relationship between the rotation amount and the driving amount according to a preference of the user and a situation.

(Step S520)

The imaging device 1 verifies whether or not the driving amount calculated in Step S510 is smaller than a maximum value in a drivable range set for the focus lens 544. The imaging device 1 proceeds to Step S540 when the calculated driving amount is smaller than the maximum value, and proceeds to Step S530 when the calculated driving amount is larger than or equal to the maximum value.

(Step S530)

The imaging device 1 sets the driving amount to the maximum value, and proceeds to Step S560.

(Step S540)

The imaging device 1 verifies whether or not the driving amount calculated in Step S510 is larger than a minimum value in the drivable range set for the focus lens 544. When the calculated driving amount is larger than the minimum value, the imaging device 1 sets the driving amount calculated in Step S510 as a final driving amount, and proceeds to Step S560. On the other hand, when the calculated driving amount is equal to or smaller than the minimum value, the imaging device 1 proceeds to Step S550.

(Step S550)

The imaging device 1 sets the driving amount to the minimum value, and proceeds to Step S560.

(Step S560)

The imaging device 1 controls the focus drive unit 532 according to the set driving amount to drive the focus lens 544. Thereafter, the imaging device 1 ends the process.

As described above, according to the present embodiment, it is possible to stably perform precise focus adjustment without significantly changing the design of the imaging device 1. Further, according to the embodiments of the present disclosure, since the optimal operation knob 100 can be attached for each user, the focus can be adjusted more precisely. Additionally, according to the embodiments of the present disclosure, since the user can adjust the focus without directly touching the lens, vibration, etc. caused by the operation of the user is not directly transmitted to the lens, and it is possible to avoid a situation in which the focus may not be precisely adjusted due to vibration, etc. In addition, according to the embodiments of the present disclosure, since a large and complicated configuration such as the follow focus described above is not mounted on the imaging device 1, it is possible to easily capture an image in a narrow place, and it is possible to ensure high mobility when an image is captured. Further, according to the embodiments of the present disclosure, unlike the follow focus described above, there is no need to provide a lens gear that meshes with the lens ring. Therefore, there is no need to attach or detach the lens gear when the lens is replaced. Thus, the time required for the lens replacement operation does not increase.

In addition, in the present embodiment, since the rotation of the operation knob 100 is directly detected in the housing 300 of the imaging device 1 without passing through a communication line, the focus adjustment can be performed without generating a time tag due to communication. As a result, according to the present embodiment, the focus can be precisely and stably adjusted. Furthermore, according to the present embodiment, since no communication line is used, there is no need to provide a mechanism for communication, and thus it is possible to avoid a drastic design change of the imaging device 1.

2.4 Modification

Figure 12:
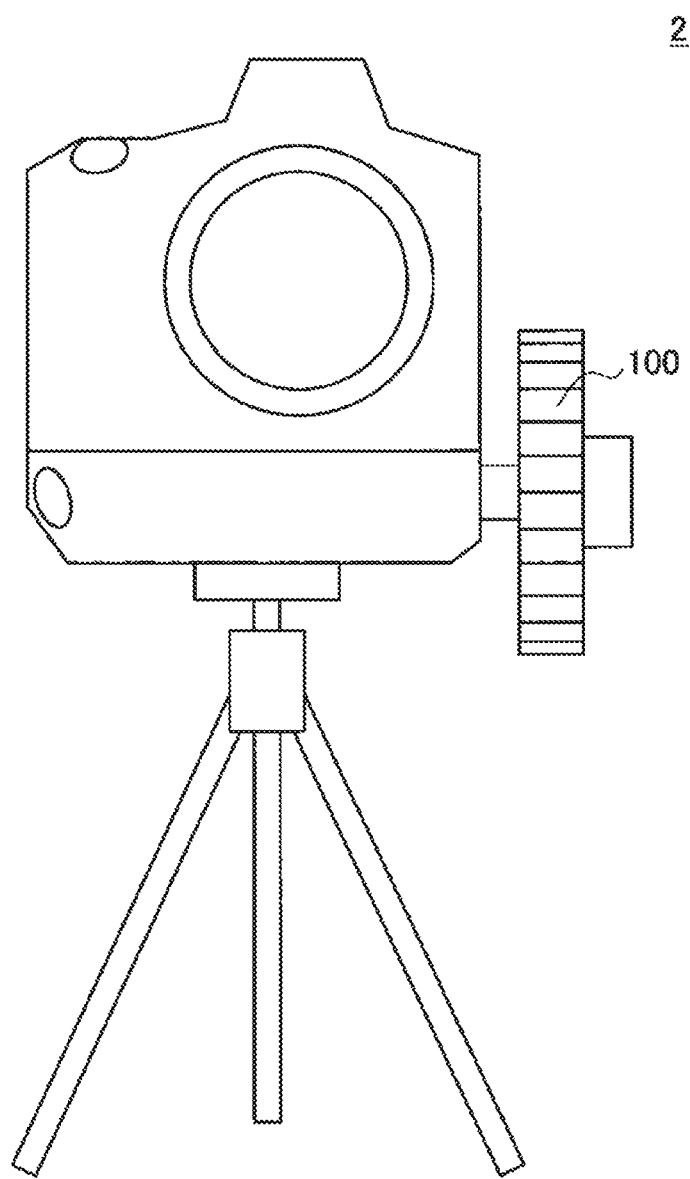
FIG. 12 is an explanatory view for description of an imaging device 2 according to a modification of the same embodiment.

In the above description, the operation knob 100 is mounted on the imaging device 1 such as a video camera. However, the invention is not limited thereto in the embodiments of the present disclosure. For example, as illustrated in FIG. 12, which is an explanatory view illustrating an imaging device 2 according to a modification of the present embodiment, the operation knob 100 may be mounted on an imaging device 2 such as a single-lens reflex camera.

3. Second Embodiment

3.1 Detailed Configuration of Control Unit 10

In the above-described first embodiment, the aperture 200, the encoder unit 342, etc. are described as being provided in the housing 300 of the imaging device 1. However, the invention is not limited to such a form in the embodiments of the present disclosure, and the aperture 200, the encoder unit 342, etc. may be provided in a control unit 10 that can be separated from the imaging device 1. Specifically, the control unit 10 is provided with an aperture 200, gears 212 and 214, and an encoder unit 342 having similar forms to those of the first embodiment. Further, the control unit 10 has a connection terminal 220 for outputting a rectangular signal (rotation amount) output from the encoder unit 342 to the outside. According to such a control unit 10, since installation is allowed at a position desired by the user, the user can operate the operation knob 100 more easily.

Figure 13:
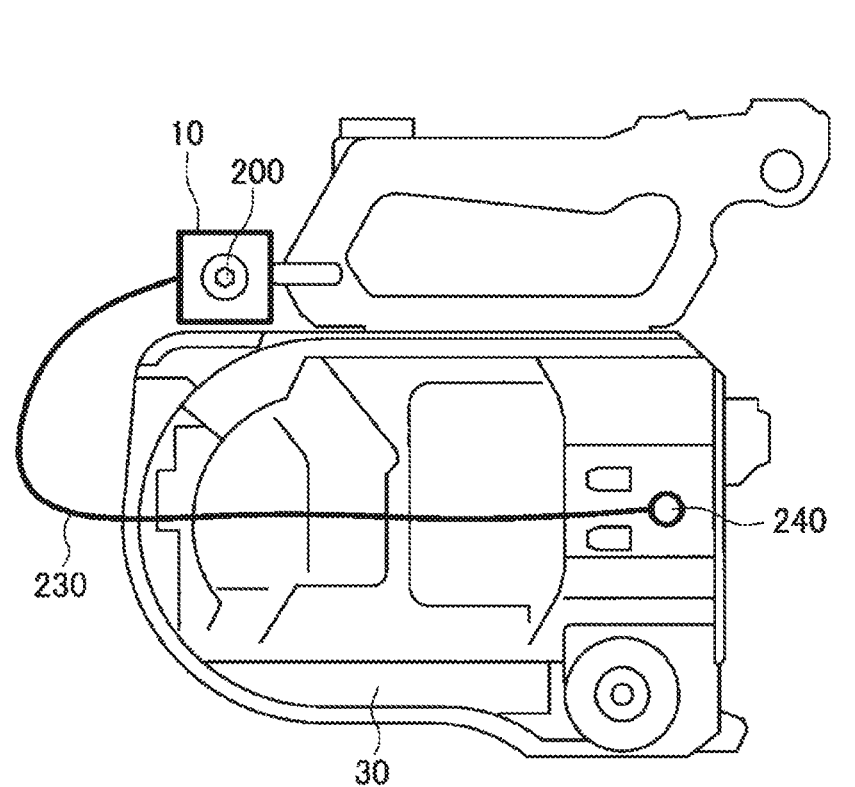
FIG. 13 is an explanatory view illustrating an attachment example of a control unit 10 according to a second embodiment of the present disclosure.
Figure 14:
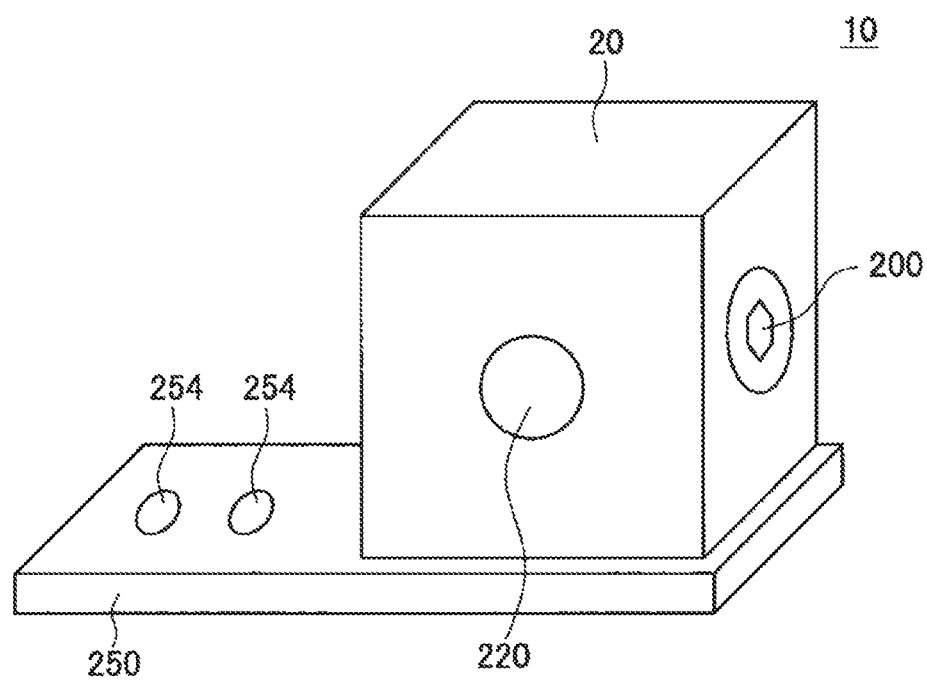
FIG. 14 is a side view of the control unit 10 according to the same embodiment.
Figure 15:
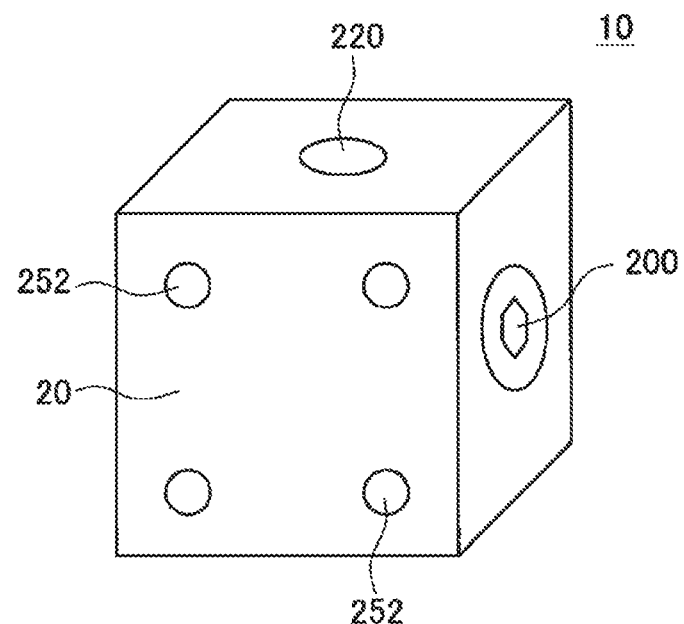
FIG. 15 is a bottom view of the control unit 10 according to the same embodiment.

Hereinafter, as a second embodiment of the present disclosure, a detailed configuration of the control unit 10 will be described with reference to FIG. 13 to FIG. 15. FIG. 13 is an explanatory view illustrating an attachment example of the control unit 10 according to the present embodiment. In addition, FIG. 14 is a side view of the control unit 10 according to the present embodiment, and FIG. 15 is a bottom view of the control unit 10 according to the present embodiment. In FIG. 13, illustration of the lens unit 500 is omitted. In addition, in FIG. 13 to FIG. 15, illustration of the operation knob 100 is omitted. Note that, in the present embodiment, similarly to the first embodiment, the operation knob 100 having an optimum shape for the user can be used as the operation knob 100. Further, the operation knob 100 can be mounted on the control unit 10 as necessary.

As illustrated in FIG. 13, the control unit 10 according to the present embodiment can be installed on an upper surface of the imaging device 1, for example. Note that the control unit 10 may not be provided at a position illustrated in FIG. 13, and can be installed at a position desired by the user. Further, similarly to the first embodiment, the control unit 10 has the aperture 200 into which the rotating shaft 110 of the operation knob 100 is inserted. Further, the control unit 10 has the connection terminal 220 (see FIG. 14), and the connection terminal 220 can be connected to a connection terminal 240 provided on the housing 300 of the imaging device 1 via a communication cable 230.

Specifically, as illustrated in FIG. 14, the control unit 10 has the aperture 200, into which the rotating shaft 110 of the operation knob 100 can be inserted, on one of side surfaces of a rectangular parallelepiped housing 20. In addition, the gears 212 and 214 that rotate according to the rotation of the rotating shaft 110, and the encoder unit 342 that detects the rotation amount of the rotating shaft 110 via the gears 212 and 214 are provided inside the housing 20. That is, similarly to the first embodiment, the control unit 10 according to the present embodiment can detect the rotation amount of the rotating shaft 110 by the encoder unit 342, and the encoder unit 342 can output two rectangular signals according to the detected rotation amount. Further, the control unit 10 has the connection terminal 220 for outputting a rectangular signal (rotation amount) output from the encoder unit 342 on another side surface of the housing 20. Further, similarly to the first embodiment, the control unit 10 detects the rotation amount of the rotating shaft 110 and outputs a rectangular signal corresponding to the rotation amount to the imaging device 1 via the connection terminal 220. Further, similarly to the first embodiment, the imaging device 1 detects the rotation amount based on the received rectangular signal, and calculates the driving amount of the focus lens 544 based on the rotation amount. A structure of the aperture 200 of the control unit 10 and a periphery thereof is the same as that in the first embodiment, and thus a description thereof will be omitted here.

Further, as illustrated in FIG. 14, the control unit 10 can be fixed to the imaging device 1 using a fixing member 250. As illustrated in FIG. 14, the fixing member 250 is provided with a screw hole 254, and the user can fix the fixing member 250 at a desired position of the imaging device 1 using the screw hole 254, a screw (not illustrated), and a screw hole (not illustrated) provided on the imaging device 1 side. Further, as illustrated in FIG. 15, four screw holes 252 are provided on a bottom surface of the housing 20 of the control unit 10. Further, screw holes (not illustrated) are provided in the fixing member 250 so as to correspond to the four screw holes 252. The user can fix the control unit 10 to the fixing member 250 by connecting the screw holes 252 with screws. That is, using such a fixing member 250, the user can install the control unit 10 at an arbitrary position of the imaging device 1. Note that a method of fixing the control unit 10 by the fixing member 250 described above is an example, and in the present embodiment, the control unit 10 can be fixed to an arbitrary position of the imaging device 1 using various existing methods.

In the present embodiment, a rectangular signal output from the encoder unit 342, a power signal, a ground signal, a detection signal of the operation knob 100, etc. are transmitted to the communication cable 230 that connects the connection terminal 220 of the control unit 10 to the connection terminal 240 of the housing 300 of the imaging device 1. Similarly to the first embodiment, detection of the operation knob 100 may be performed by detecting insertion of the rotating shaft 110 using the switch 210, or may be performed by detecting insertion of the rotating shaft 110 using the switch 210 and detecting that connection between the imaging device 1 and the control unit 10 is ensured. In such a case, a detection signal of the operation knob 100 may not be transmitted to the communication cable 230.

In addition, in the above-described embodiment, a description has been given on the assumption that the imaging device 1 and the control unit 10 are connected via the communication cable 230. However, in the present embodiment, the invention is not limited thereto, and the imaging device 1 and the control unit 10 may be directly connected without the communication cable 230 interposed therebetween.

As described above, according to the present embodiment, since the control unit 10 can be installed at a position desired by the user, the user can operate the operation knob 100 more easily.

3.2 Modification

Figure 16:
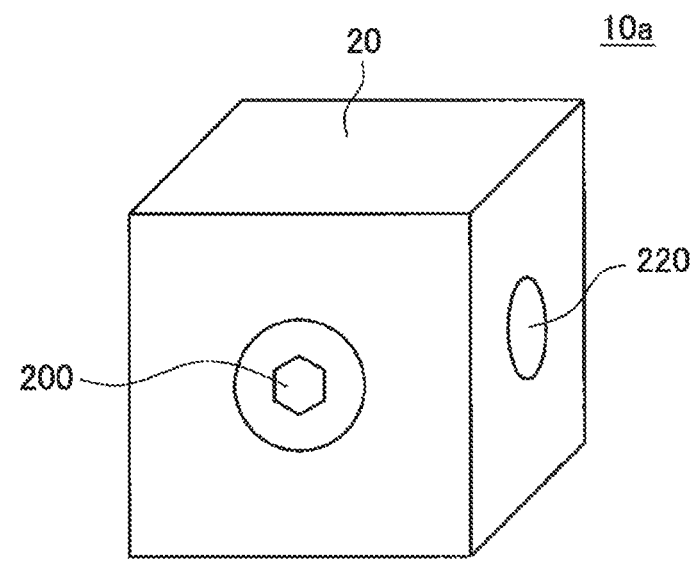
FIG. 16 is an explanatory view illustrating an example of a control unit 10a according to a modification of the same embodiment.

Further, the control unit 10 according to the present embodiment may not be fixed to the imaging device 1. For example, as in a remote release of a camera, the control unit 10 may be connected to the imaging device 1 via the communication cable 230 and used while the user holds the control unit 10 in a hand of the user. Hereinafter, as a modification of the present embodiment, a control unit 10*a* described above will be described with reference to FIG. 16. FIG. 16 is an explanatory view illustrating an example of the control unit 10*a* according to the modification of the present embodiment. In FIG. 16, illustration of the operation knob 100 is omitted. In addition, in the present modification, similarly to the first and second embodiments, the operation knob 100 having an optimum shape for the user can be used as the operation knob 100. Further, the operation knob 100 can be mounted on the control unit 10*a* as necessary.

As illustrated in FIG. 16, the control unit 10*a* has the aperture 200, into which the rotating shaft 110 of the operation knob 100 is inserted, on one of side surfaces of the rectangular parallelepiped housing 20. Further, the control unit 10*a* has the connection terminal 220 for outputting a rectangular signal (rotation amount) output from the encoder unit 342 on another side surface of the housing 20. The connection terminal 220 is connected to the imaging device 1 via the communication cable 230. A structure of the inside of the control unit 10, the aperture 200 and a periphery thereof is the same as that in the first and second embodiments, and thus a description thereof will be omitted here. As long as the control unit 10*a* is connected to the imaging device 1 by the communication cable 230, the user can perform an operation for adjusting the focus in a free state while holding the control unit 10*a* in the hand.

4. Third Embodiment

4.1 Imaging Method

In the first embodiment described above, the driving amount of the focus lens 544 is calculated with reference to the conversion curve (relationship information) that determines the relationship between the number of edges and the driving amount set in advance. However, in the embodiments of the present disclosure, the invention is not limited to calculating the driving amount of the focus lens 544 using the conversion curve as described above. For example, in the embodiments of the present disclosure, the conversion curve may be automatically selected using another parameter, etc. related to the imaging device 1, and the driving amount of the focus lens 544 may be calculated with reference to the selected conversion curve.

Figure 17:
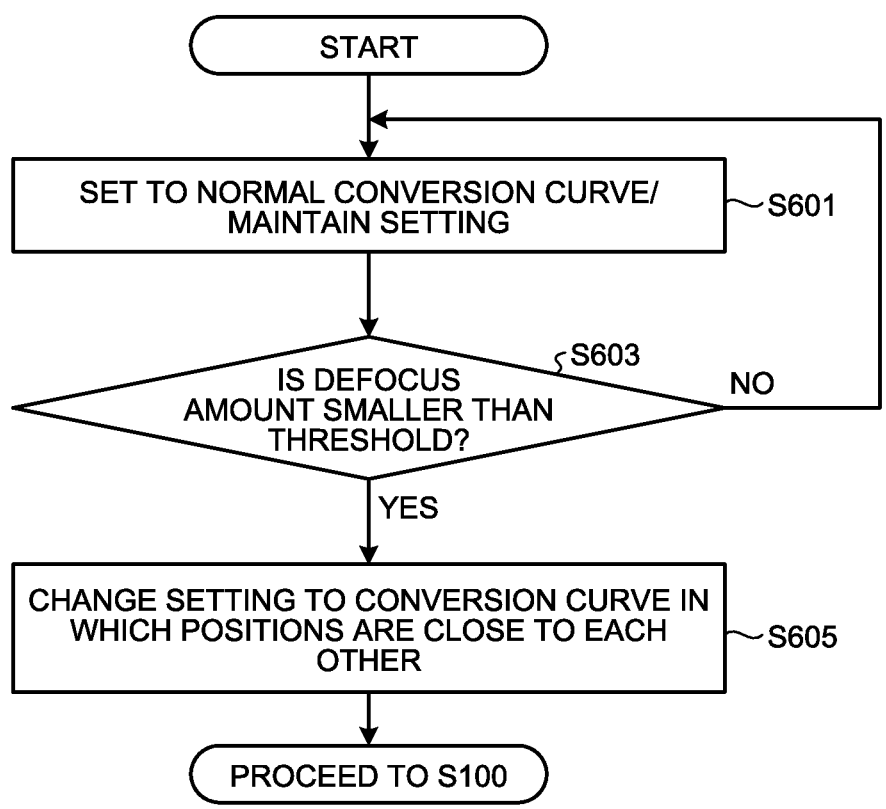
FIG. 17 is a flowchart of an imaging method according to a third embodiment of the present disclosure.
Figure 18:
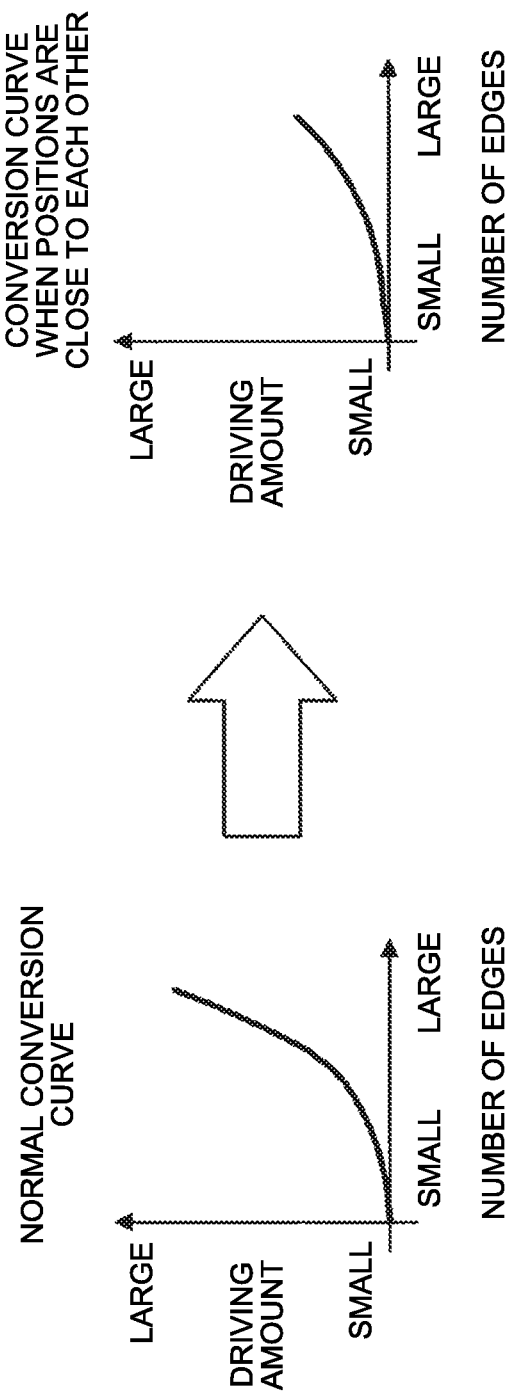
FIG. 18 is an explanatory view for description of the imaging method according to the same embodiment.

Therefore, hereinafter, as a third embodiment of the present disclosure, a description will be given of an imaging method of detecting a defocus amount (a shift amount of the focus indicating a degree of shifting with respect to a state in which the subject is in focus) (shift from an in-focus position) of a current subject of the imaging device 1 using the image plane phase difference detection pixel (not illustrated) included in the imaging element 310 of the imaging device 1, and selecting a conversion curve based on the detected defocus amount with reference to FIG. 17 and FIG. 18. FIG. 17 is a flowchart of the imaging method according to the present embodiment, and FIG. 18 is an explanatory view for description of the imaging method according to the present embodiment.

Incidentally, when the user attempts to manually adjust the focus of the imaging device 1, if a position of the focus lens 544 of the imaging device 1 before adjustment is close to a position at which light from the subject can be focused on one point of the light receiving surface of the imaging element 310, a driving amount by which the user needs to drive the focus lens 544 becomes smaller. That is, in such a situation, the user is required to precisely operate the operation knob 100 to drive the focus lens 544 little by little in order to precisely adjust the focus. In the case where the user largely drives the focus lens 544, a focus state may be passed, and thus the user precisely operates the operation knob 100 to avoid such a passing. However, as described above, it is difficult for the user to operate the focus lens 544 little by little.

Therefore, in the present embodiment, when the position of the focus lens 544 of the imaging device 1 before adjustment is close to the position presumed to be in focus, the driving amount is calculated using a conversion curve in which the driving amount is small, that is, the slope is gentle relative to the rotation amount (specifically, the number of edges) of the rotating shaft 110 of the operation knob 100. In this way, even when the user erroneously operates the operation knob 100 largely, since the focus lens 544 can be driven small, it is possible to avoid the above-described passing.

Further, in the present embodiment, by detecting the defocus amount (shift from the in-focus position) with respect to the current subject of the imaging device 1 using the pair of image plane phase difference detection pixels (not illustrated) included in the imaging element 310, it is possible to determine whether or not the position of the focus lens 544 before the adjustment is close to the position presumed to be in focus.

More specifically, in the present embodiment, when the detected defocus amount is smaller than a predetermined threshold, it is presumed that the position of the focus lens 544 before adjustment is close to the position in focus, and the conversion curve is changed from a normal conversion curve to a conversion curve when the positions are close to each other. In the conversion curve when the positions are close to each other, the driving amount is small, that is, the slope is gentle relative to the rotation amount (specifically, the number of edges) of the rotating shaft 110 of the operation knob 100 when compared to the normal conversion curve. In the present embodiment, by calculating the driving amount using such a conversion curve when the positions are close to each other, the focus lens 544 can be driven small even when the user erroneously operates the operation knob 100 largely. As a result, according to the present embodiment, it is possible to avoid passing through a focused state.

Such an imaging method according to the present embodiment can be illustrated by the flowchart of FIG. 17. As illustrated in FIG. 17, the imaging method according to the present embodiment includes a plurality of steps from Step S601 to Step S605. Hereinafter, details of each step of the imaging method according to the present embodiment will be described.

(Step S601)

The imaging device 1 sets the conversion curve used for calculation of the driving amount to the normal conversion curve, or maintains such setting. The normal conversion curve is illustrated, for example, on the left side of FIG. 18.

(Step S603)

The imaging device 1 detects the defocus amount (shift from the focused position) with respect to the current subject using the pair of image plane phase difference detection pixels (not illustrated). Further, the imaging device 1 compares the detected defocus amount with a predetermined threshold. When the defocus amount is smaller than or equal to the predetermined threshold, the imaging device 1 proceeds to Step S605. On the other hand, when the defocus amount is larger than the predetermined threshold, the imaging device 1 returns to Step S601.

(Step S605)

The imaging device 1 changes setting of the conversion curve used for calculation of the driving amount from the normal conversion curve to the conversion curve when the positions are close to each other (right side of FIG. 18). As can be seen from FIG. 18, since the conversion curve when the positions are close to each other has a gentler slope than that of the normal conversion curve, the driving amount with respect to the number of edges decreases, that is, the sensitivity of the driving amount with respect to the number of edges decreases. Therefore, by using such a conversion curve when the positions are close to each other, the focus lens 544 can be driven small even when the user erroneously operates the operation knob 100 largely. As a result, according to the present embodiment, the user can precisely adjust the focus, and it is possible to avoid passing through a focused state. Thereafter, the imaging device 1 performs the imaging method of the first embodiment of FIG. 9 described above.

As described above, in the present embodiment, the defocus amount detected by the image plane phase difference detection pixels (not illustrated) is compared with the predetermined threshold, and the conversion curve used when the driving amount is calculated is changed to a conversion curve in which the sensitivity of the driving amount with respect to the number of edges is low (the conversion curve when the positions are close to each other) according to a comparison result. As a result, according to the present embodiment, the user can precisely adjust the focus, and it is possible to avoid passing through a focused state.

The predetermined threshold described above can be arbitrarily set in advance by the user. For example, the user may set an optimum value as the predetermined threshold in consideration of the easiness of the operation of the user, etc. In addition, in the above description, the conversion curve is selected and changed according to the detected defocus amount. However, the present embodiment is not limited thereto, and the conversion table may be selected according to the defocus amount.

4.2 Modification

Incidentally, when the user attempts to manually adjust the focus of the imaging device 1, in the case where a position of the focus lens 544 of the imaging device 1 before adjustment is far from a position at which light from the subject can be focused on one point of the light receiving surface of the imaging element 310, a driving amount by which the user needs to drive the focus lens 544 becomes larger. Therefore, in such a situation, in the case where the operation amount of the user on the operation knob 100, that is, the sensitivity of the driving amount with respect to the rotation amount (number of edges) of the rotating shaft 110 is high, the driving amount increases even when the operation amount is small. Thus, focusing can be promptly performed, and convenience for the user is improved.

Therefore, in the present modification, when the position of the focus lens 544 of the imaging device 1 before adjustment is far from the position presumed to be in focus, the driving amount is calculated using a conversion curve in which the driving amount is large, that is, the slope is steep relative to the rotation amount (specifically, the number of edges) of the rotating shaft 110 of the operation knob 100. In this way, even when the operation amount of the user is small, the driving amount increases. Thus, it is possible to promptly perform focusing and to improve convenience.

More specifically, in the present modification, when the detected defocus amount is larger than a predetermined first threshold, it is presumed that the position of the focus lens 544 before adjustment is far from the position in focus, and the conversion curve is changed from a normal conversion curve to a conversion curve when the positions are far from each other. In the conversion curve when the positions are far from each other, the driving amount is large, that is, the slope is steep relative to the rotation amount (specifically, the number of edges) of the rotating shaft 110 of the operation knob 100 when compared to the normal conversion curve. In the present embodiment, by calculating the driving amount using such a conversion curve when the positions are far from each other, even when the operation amount of the user is small, the driving amount increases. Thus, it is possible to promptly perform focusing and to improve convenience.

Figure 19:
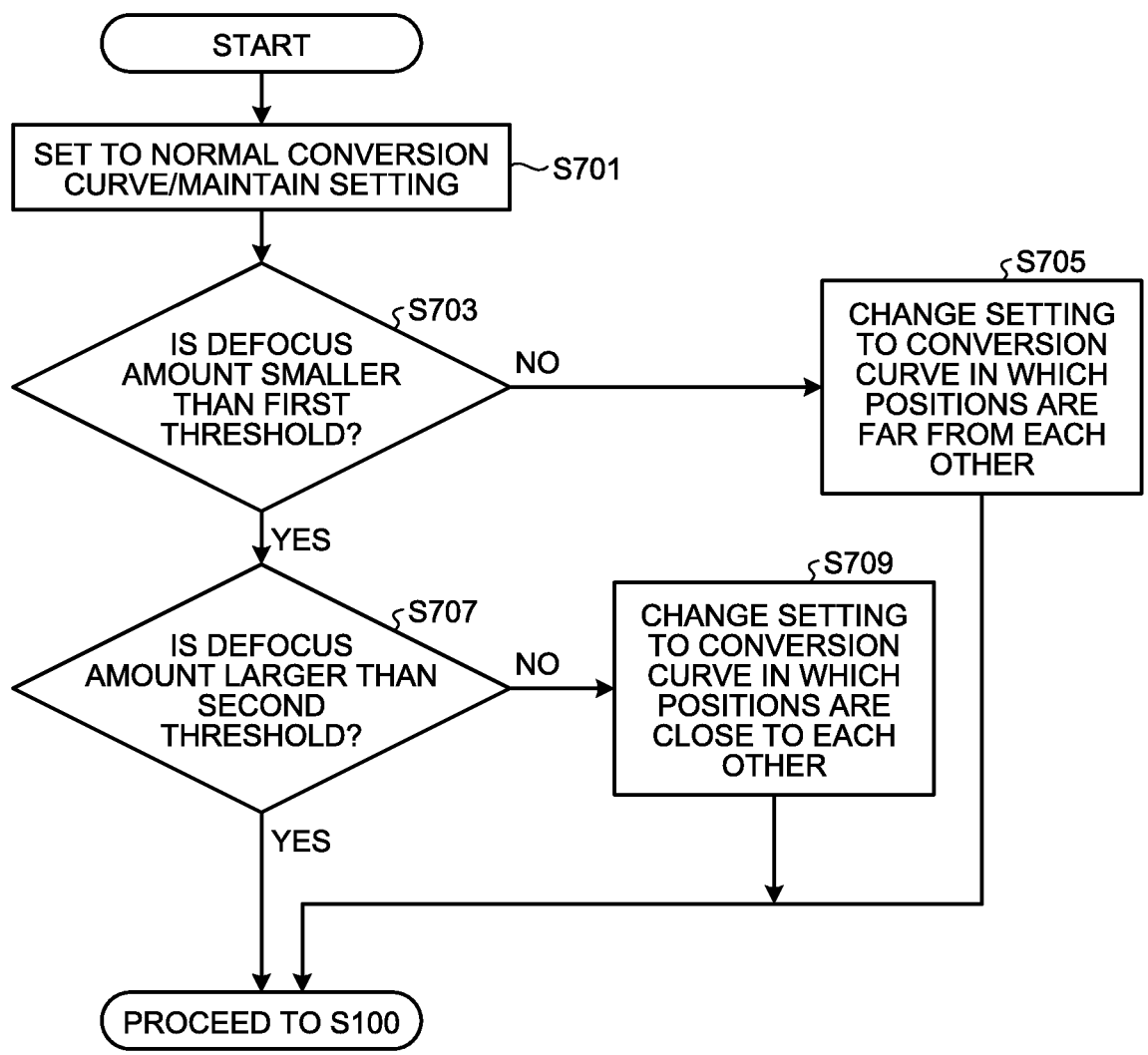
FIG. 19 is a flowchart of an imaging method according to a modification of the same embodiment.
Figure 20:
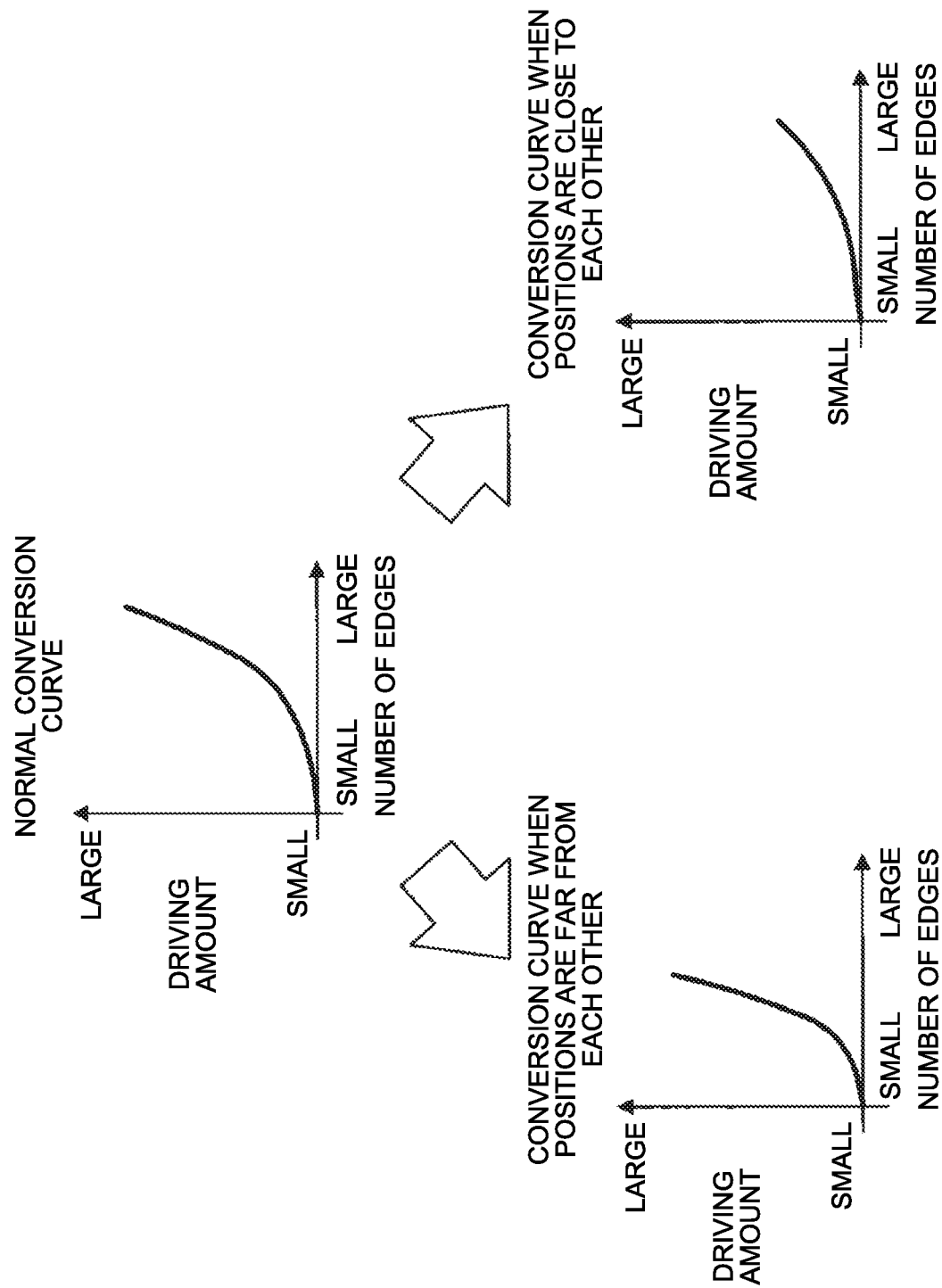
FIG. 20 is an explanatory view for description of the imaging method according to the modification of the same embodiment.

Such an imaging method according to the present modification will be described with reference to FIG. 19 and FIG. 20. FIG. 19 is a flowchart of the imaging method according to a modification of the present embodiment, and FIG. 20 is an explanatory view for description of the imaging method according to the modification of the present embodiment. As illustrated in FIG. 19, the imaging method according to the present embodiment includes a plurality of steps from Step S701 to Step S709. Hereinafter, details of each step of the imaging method according to the present embodiment will be described.

(Step S701)
The imaging device 1 performs a similar step to Step S601 of the present embodiment illustrated in FIG. 18.

(Step S703)
The imaging device 1 detects the defocus amount (shift from the focused position) with respect to the current subject using the pair of image plane phase difference detection pixels (not illustrated). Further, the imaging device 1 compares the detected defocus amount with a predetermined first threshold. When the defocus amount is smaller than or equal to the predetermined first threshold, the imaging device 1 proceeds to Step S703. On the other hand, when the defocus amount is larger than the predetermined first threshold, the imaging device 1 proceeds to Step S705.

(Step S705)
The imaging device 1 changes setting of the conversion curve used for calculation of the driving amount from the normal conversion curve to the conversion curve when the positions are close to each other (lower left side of FIG. 20). As can be seen from FIG. 20, since the conversion curve when the positions are far from each other has a steeper slope than that of the normal conversion curve, the driving amount with respect to the number of edges increases, that is, the sensitivity of the driving amount with respect to the number of edges increases. Therefore, by using such a conversion curve when the positions are far from each other, even when the operation amount of the user is small, the driving amount increases. Thus, it is possible to promptly perform focusing and to improve convenience.

(Step S707)
The imaging device 1 compares the detected defocus amount with a predetermined second threshold. When the defocus amount is larger than the predetermined second threshold, the imaging device 1 proceeds to Step S100 of the imaging method of the first embodiment of FIG. 9 described above. On the other hand, when the defocus amount is smaller than or equal to the predetermined second threshold, the imaging device 1 proceeds to Step S709. Note that it is presumed that the second threshold is smaller than the above-described first threshold.

(Step S709)
Similarly to Step S605 of the present embodiment illustrated in FIG. 17, the imaging device 1 changes setting of the conversion curve used for calculation of the driving amount from the normal conversion curve to the conversion curve when the positions are close to each other (lower right side of FIG. 20). Thereafter, the imaging device 1 performs the imaging method of the first embodiment of FIG. 9 described above.

As described above, in the present modification, according to the defocus amount detected by the image plane phase difference detection pixels (not illustrated), the conversion amount used when the driving amount is calculated is changed to a conversion curve in which the sensitivity of the driving amount with respect to the number of edges is high (the conversion curve when the positions are far from each other). As a result, according to the present embodiment, even when the operation amount of the user is small, the driving amount increases. Thus, it is possible to promptly perform focusing and to improve convenience.

The first and second thresholds described above can be arbitrarily set in advance by the user. For example, the user may set an optimum value as the predetermined threshold in consideration of the easiness of the operation of the user, etc.

In the third embodiment and the modification described above, the conversion curve is selected according to the defocus amount. However, the embodiments of the present disclosure are not limited thereto. For example, in the embodiments of the present disclosure, a conversion curve may be selected according to a type (shape) of the operation knob 100. Depending on the shape of the operation knob 100, by a small operation, the rotating shaft 110 largely rotates in some cases, and the rotating shaft 110 slightly rotates in some cases. Therefore, since the rotation tendency is changed by the operation knob 100, ease of the user operation can be further improved by changing the operation amount of the user on the operation knob 100, that is, the sensitivity of the driving amount with respect to the rotation amount (the number of edges) of the rotating shaft 110 accordingly.

For example, the type of the operation knob 100 may be input by the user to the imaging device 1 in advance, and the imaging device 1 may select a conversion curve used when the driving amount is calculated accordingly. Alternatively, in the case where the operation knob 100 is provided with a mechanism for outputting identification information for identifying the type of the operation knob from the operation knob 100, the imaging device 1 may detect the identification information when the operation knob 100 is inserted into the aperture 200, and select a conversion curve according to a detection result.

Further, for example, in the embodiments of the present disclosure, the conversion curve may be selected according to the type of the lens (lens unit 500) mounted on the imaging device 1. A reason therefor is that in the case of attempting to ensure ease of the user operation, a suitable slope, etc. in the conversion curve changes according to characteristics of various lenses (telephoto lens, macro lens, etc.). Therefore, for example, the type of the lens may be input by the user to the imaging device 1 in advance, and the imaging device 1 may select a conversion curve used when the driving amount is calculated accordingly. Alternatively, when a lens attachment portion (not illustrated) of the imaging device 1 is provided with a signal contact (not illustrated) for exchanging signals with the lens, the imaging device 1 may detect identification information for recognizing a type of the lens output from the lens through the signal contact. In this case, when the lens is mounted in the housing 300 of the imaging device 1, the imaging device 1 may detect the identification information and select a conversion curve according to a detection result.

5. Application Example

A technology according to the present disclosure can be applied to various products. For example, the technology according to the present disclosure may be applied to an endoscopic surgery system.

FIG. 20 is a diagram illustrating an example of a schematic configuration of an endoscopic surgery system 5000 to which the technology according to the present disclosure can be applied. FIG. 20 illustrates a situation where an operator (doctor) 5067 performs an operation on a patient 5071 on a patient bed 5069 using the endoscopic surgery system 5000. As illustrated in the figure, the endoscopic surgery system 5000 includes an endoscope 5001, other surgical tools 5017, a support arm device 5027 for supporting the endoscope 5001, and a cart 5037 equipped with various devices for endoscopic surgery.

In endoscopic surgery, a plurality of tubular opening devices referred to as trocars 5025a to 5025d is punctured into an abdominal wall instead of cutting the abdominal wall and opening an abdomen. Then, a lens barrel 5003 of the endoscope 5001 and the other surgical tools 5017 are inserted into a body cavity of the patient 5071 from the trocars 5025a to 5025d. In the illustrated example, a pneumoperitoneum tube 5019, an energy treatment tool 5021, and forceps 5023 are inserted into the body cavity of the patient 5071 as the other surgical tools 5017. In addition, the energy treatment tool 5021 is a treatment tool that performs incision and exfoliation of tissue, sealing of blood vessels, etc. by high-frequency current or ultrasonic vibration. However, the illustrated surgical tool 5017 is merely an example, and various surgical tools generally used in endoscopic surgery, such as tweezers, a retractor, etc., may be used as the surgical tool 5017.

An image of a surgical site in the body cavity of the patient 5071 captured by the endoscope 5001 is displayed on the display device 5041. An operator 5067 performs a procedure such as excision of an affected part using the energy treatment tool 5021 and the forceps 5023 while viewing the image of the surgical site displayed on the display device 5041 in real time. Although not illustrated, the pneumoperitoneum tube 5019, the energy treatment tool 5021, and the forceps 5023 are supported by the operator 5067 or an assistant during the operation.

(Support Arm Device 5027)

The support arm device 5027 includes an arm 5031 extending from a base 5029. In the illustrated example, the arm 5031 includes joints 5033a, 5033b, and 5033c and links 5035a and 5035b, and is driven by control from an arm control device 5045. The endoscope 5001 is supported by the arm 5031, and a position and a posture thereof are controlled. In this way, stable fixing of the position of the endoscope 5001 can be implemented.

(Endoscope 5001)

The endoscope 5001 includes the lens barrel 5003 having a region of a predetermined length from a distal end inserted into the body cavity of the patient 5071, and a camera head 5005 connected to a proximal end of the lens barrel 5003. In the illustrated example, the endoscope 5001 configured as a so-called rigid endoscope having a hard lens barrel 5003 is illustrated. However, the endoscope 5001 may be configured as a so-called flexible endoscope having a soft lens barrel 5003.

An aperture into which an objective lens is fit is provided at the distal end of the lens barrel 5003. A light source device 5043 is connected to the endoscope 5001, and light generated by the light source device 5043 is guided to the distal end of the lens barrel by a light guide extending inside the lens barrel 5003, and is directed toward an observation target in the body cavity of the patient 5071 through the objective lens. Note that the endoscope 5001 may correspond to a direct-view endoscope, a perspective-view endoscope, or a side-view endoscope.

An optical system and an imaging element are provided inside the camera head 5005, and the reflected light (observation light) from the observation target is focused on the imaging element by the optical system. The observation light is photoelectrically converted by the imaging element, and an electric signal corresponding to the observation light, that is, an image signal corresponding to the observation image is generated. The image signal is transmitted to a camera control unit (CCU) 5039 as RAW data. The camera head 5005 has a function of adjusting the magnification and the focal length by appropriately driving the optical system.

Note that the camera head 5005 may be provided with a plurality of imaging elements to correspond to, for example, stereoscopic viewing (3D display), etc. In this case, a plurality of relay optical systems is provided inside the lens barrel 5003 to guide observation light to each of the plurality of imaging elements.

(Various Devices Mounted on Cart)

The CCU 5039 includes a central processing unit (CPU), a graphics processing unit (GPU), etc., and controls operations of the endoscope 5001 and the display device 5041 in an integrated manner. Specifically, the CCU 5039 performs various types of image processing for displaying an image based on the image signal, such as development processing (demosaic processing), on the image signal received from the camera head 5005. The CCU 5039 provides the image signal subjected to the image processing to the display device 5041. In addition, the CCU 5039 transmits a control signal to camera head 5005, and controls driving thereof. The control signal may include information related to an imaging condition such as the magnification or the focal length.

The display device 5041 displays an image based on the image signal subjected to image processing by the CCU 5039 under the control of the CCU 5039. When the endoscope 5001 corresponds to high-resolution imaging of, for example, 4K (3,840 horizontal pixels×2,160 vertical pixels) or 8K (7,680 horizontal pixels×4,320 vertical pixels), and/or corresponds to 3D display, a device capable of performing high-resolution display and/or a device capable of performing 3D display may be used as the display device 5041 to correspond thereto, respectively. In the case of corresponding to imaging at a high resolution such as 4K or 8K, the use of a display device 5041 having a size of 55 inches or more can provide a more immersive feeling. Further, a plurality of display devices 5041 having different resolutions and sizes may be provided depending on the application.

The light source device 5043 includes, for example, a light source such as a light emitting diode (LED), and supplies the endoscope 5001 with irradiation light when imaging the surgical site.

The arm control device 5045 includes a processor such as a CPU, for example, and operates according to a predetermined program to control driving of the arm 5031 of the support arm device 5027 according to a predetermined control method.

The input device 5047 is an input interface to the endoscopic surgery system 5000. The user can input various types of information and input instructions to the endoscopic surgery system 5000 via the input device 5047. For example, the user inputs, via the input device 5047, various types of information related to surgery, such as body information of the patient or information about a surgical procedure. In addition, for example, the user inputs, via the input device 5047, an instruction for driving the arm 5031, an instruction for changing an imaging condition (a type of irradiation light, the magnification, the focal length, etc.) by the endoscope 5001, an instruction for driving the energy treatment tool 5021, etc.

The type of the input device 5047 is not limited, and the input device 5047 may correspond to various known input devices. As the input device 5047, for example, it is possible to apply a mouse, a keyboard, a touch panel, a switch, a foot switch 5057, and/or a lever. When the touch panel is used as the input device 5047, the touch panel may be provided on a display surface of the display device 5041.

Alternatively, the input device 5047 corresponds to a device worn by the user such as a glasses-type wearable device or a head mounted display (HMD), and various inputs are performed in accordance with a gesture or a gaze of the user detected by these devices. Further, the input device 5047 includes a camera capable of detecting movement of the user, and various inputs are performed in accordance with a gesture or a gaze of the user detected from an image captured by the camera. Further, the input device 5047 includes a microphone capable of collecting voice of the user, and various inputs are performed by voice via the microphone. In this way, when the input device 5047 is configured to be able to input various types of information in a non-contact manner, the user belonging to a clean area (for example, the operator 5067) can operate a device belonging to the unclean area in a non-contact manner. In addition, since the user can operate the device without releasing a hand from the surgical tool in hand, the convenience of the user is improved.

A treatment tool control device 5049 controls driving of the energy treatment tool 5021 for cauterization and incision of tissue, sealing of a blood vessel, etc. A pneumoperitoneum device 5051 sends gas into the body cavity via the pneumoperitoneum tube 5019 to inflate the body cavity of the patient 5071 in order to ensure a visual field by the endoscope 5001 and ensure a working space of the operator. A recorder 5053 is a device that can record various types of information related to surgery. A printer 5055 is a device capable of printing various types of information related to surgery in various formats such as text, an image, a graph, etc.

Hereinafter, a particularly characteristic configuration of the endoscopic surgery system 5000 will be described in more detail.

(Support Arm Device 5027)

Figure 21:
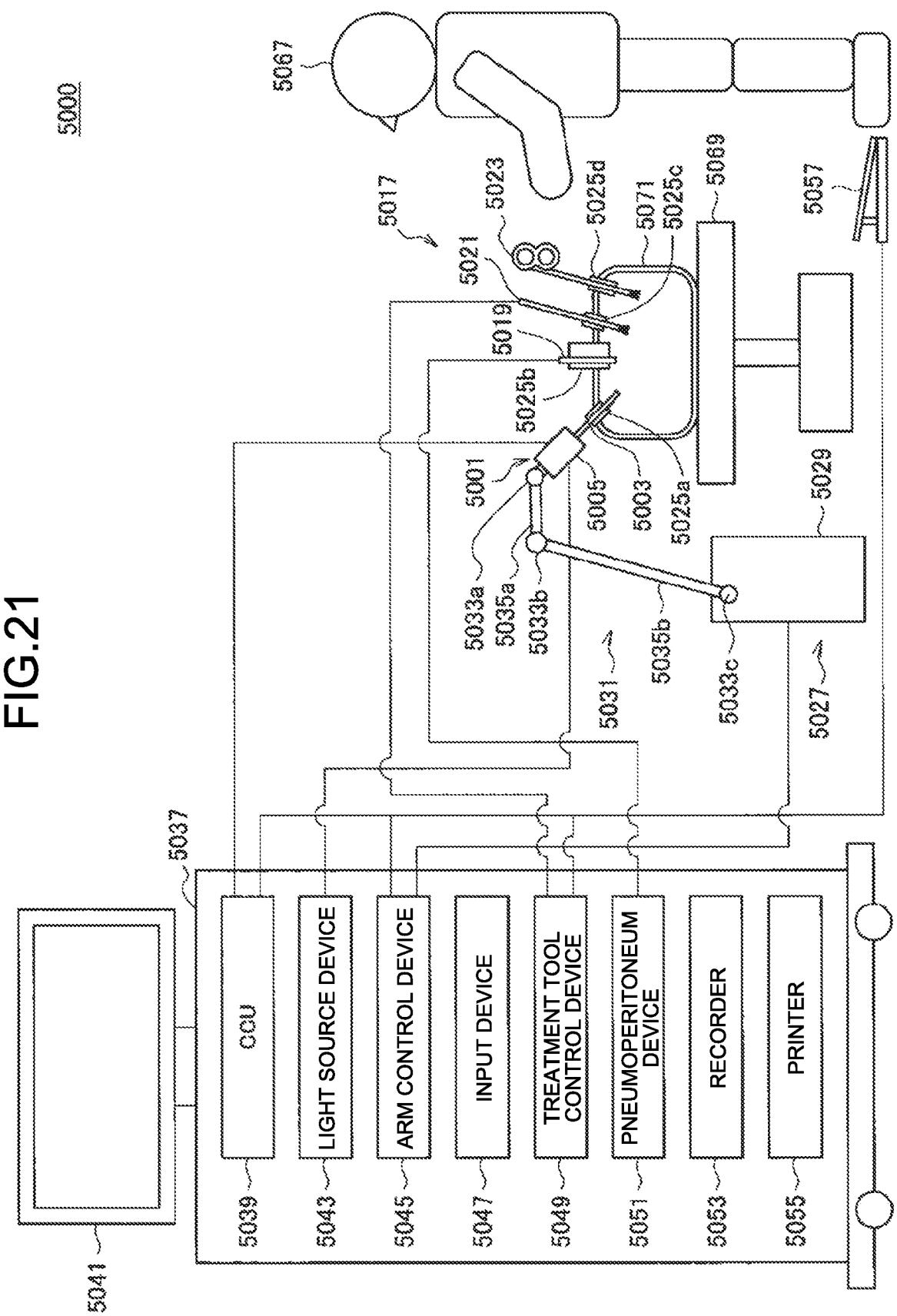
FIG. 21 is a diagram illustrating an example of a schematic configuration of an endoscopic surgery system.

The support arm device 5027 includes the base 5029 corresponding to a base and the arm 5031 extending from the base 5029. In the illustrated example, the arm 5031 includes a plurality of joints 5033a, 5033b, and 5033c, and a plurality of links 5035a and 5035b connected by the joint 5033b. For the sake of simplicity, FIG. 21 illustrates a configuration of the arm 5031 in a simplified manner. In practice, shapes, the numbers and arrangements of the joints 5033a to 5033c and the links 5035a and 5035b, and directions of rotation axes of the joints 5033a to 5033c may be appropriately set so that the arm 5031 has a desired degree of freedom. For example, the arm 5031 can be preferably configured to have a degree of freedom of 6 degrees of freedom or more. In this way, the endoscope 5001 can be freely moved within a movable range of the arm 5031, and thus the lens barrel 5003 of the endoscope 5001 can be inserted into the body cavity of the patient 5071 from a desired direction.

The joints 5033a to 5033c are provided with an actuator, and the joints 5033a to 5033c are configured to be rotatable around predetermined rotation axes by driving the actuators. When driving of the actuator is controlled by the arm control device 5045, a rotation angle of each of the joints 5033a to 5033c is controlled, and driving of the arm 5031 is controlled. In this way, control of the position and the posture of the endoscope 5001 can be implemented. In this instance, the arm control device 5045 can control the driving of the arm 5031 by various known control methods such as force control, position control, etc.

For example, the operator 5067 may perform an appropriate operation input via the input device 5047 (including the foot switch 5057), so that driving of the arm 5031 is appropriately controlled by the arm control device 5045 according to the operation input, and the position and the posture of the endoscope 5001 is controlled. By this control, the endoscope 5001 at the distal end of the arm 5031 can be moved from an arbitrary position to an arbitrary position, and then fixedly supported at a position after movement. Note that the arm 5031 may be operated by a so-called master slave method. In this case, the arm 5031 can be remotely operated by the user via the input device 5047 installed at a position away from an operating room.

In addition, when the force control is applied, the arm control device 5045 receives an external force from the user, and may perform so-called power assist control for driving the actuator of each of the joints 5033a to 5033c so that the arm 5031 smoothly moves according to the external force. In this way, when the user moves the arm 5031 while directly touching the arm 5031, the arm 5031 can be moved with a relatively light force. Therefore, the endoscope 5001 can be moved more intuitively through a simpler operation, and the convenience for the user can be improved.

Here, generally, in endoscopic surgery, the endoscope 5001 has been supported by a doctor called a scopist. On the other hand, when the support arm device 5027 is used, the position of the endoscope 5001 can be more reliably fixed without manual operation, so that an image of the surgical site can be stably obtained, and the operation can be smoothly performed.

Note that the arm control device 5045 may not be provided in the cart 5037. Further, the arm control device 5045 may not correspond to one device. For example, the arm control device 5045 may be provided in each of the joints 5033a to 5033c of the arm 5031 of the support arm device 5027, and the drive control of the arm 5031 may be implemented by the cooperation of the plurality of arm control devices 5045 with each other.

(Light Source Device 5043)

The light source device 5043 supplies the endoscope 5001 with irradiation light at the time of imaging the surgical site. The light source device 5043 includes, for example, a white light source including an LED, a laser light source, or a combination thereof. In this instance, when a white light source is configured by a combination of RGB laser light sources, the output intensity and output timing of each color (each wavelength) can be controlled with high accuracy, and thus the light source device 5043 can adjust white balance of a captured image. In addition, in this case, the laser light from each of the RGB laser light sources is irradiated to the observation target in a time-division manner, and driving of the imaging element of the camera head 5005 is controlled in synchronization with the irradiation timing. In this way, it is possible to capture an image corresponding to each of RGB in a time-division manner. According to this method, a color image can be obtained without providing a color filter in the imaging element.

In addition, driving of the light source device 5043 may be controlled to change the intensity of light to be output at predetermined time intervals. By controlling driving of the imaging element of the camera head 5005 in synchronization with the timing of the change of the light intensity to acquire an image in a time-division manner, and synthesizing the image, it is possible to generate an image in a high dynamic range without so-called underexposure and overexposure.

Further, the light source device 5043 may be configured to be able to supply light in a predetermined wavelength band corresponding to special light observation. In special light observation, for example, wavelength dependence of light absorption in body tissue is used to irradiate light in a narrower band than that of irradiation light during normal observation (that is, white light), thereby performing so-called narrow band imaging for imaging predetermined tissue such as a blood vessel on a mucosal surface at high contrast. Alternatively, in special light observation, a fluorescence observation for obtaining an image by fluorescence generated by irradiating excitation light may be performed. In fluorescence observation, body tissue may be irradiated with excitation light and fluorescence from the body tissue may be observed (autofluorescence observation), or a reagent such as indocyanine green (ICG) may be locally injected into body tissue and the body tissue may be irradiated with excitation light corresponding to a fluorescence wavelength of the reagent to obtain a fluorescence image. The light source device 5043 can be configured to be able to supply narrowband light and/or excitation light corresponding to such special light observation.

(Camera Head 5005 and CCU 5039)

Figure 22:
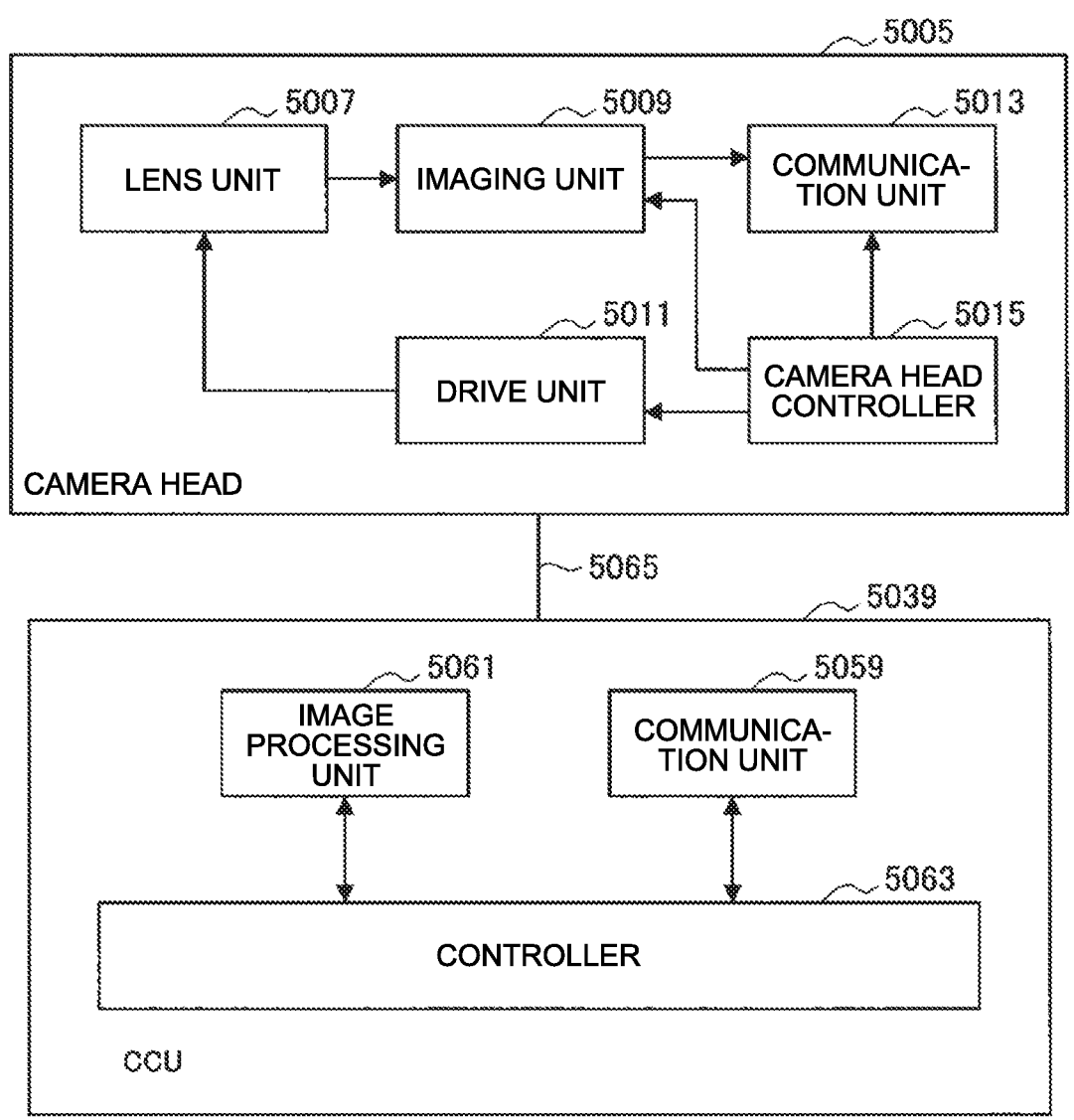
FIG. 22 is a block diagram illustrating an example of a functional configuration of a camera head and a CCU illustrated in FIG. 21.

The functions of the camera head 5005 and the CCU 5039 of the endoscope 5001 will be described in more detail with reference to FIG. 22. FIG. 22 is a block diagram illustrating an example of a functional configuration of the camera head 5005 and the CCU 5039 illustrated in FIG. 21.

Referring to FIG. 22, the camera head 5005 includes, as functions thereof, a lens unit 5007, an imaging unit 5009, a drive unit 5011, a communication unit 5013, and a camera head controller 5015. In addition, the CCU 5039 includes, as functions thereof, a communication unit 5059, an image processing unit 5061, and a controller 5063. The camera head 5005 and the CCU 5039 are bi-directionally communicably connected by a transmission cable 5065.

First, a functional configuration of the camera head 5005 will be described. The lens unit 5007 is an optical system provided at a portion connected to the lens barrel 5003. Observation light taken in from the distal end of the lens barrel 5003 is guided to the camera head 5005 and enters the lens unit 5007. The lens unit 5007 is configured by combining a plurality of lenses including a zoom lens and a focus lens. An optical characteristic of the lens unit 5007 is adjusted so that observation light is condensed on a light receiving surface of an imaging element of the imaging unit 5009. In addition, the zoom lens and the focus lens are configured such that positions thereof on the optical axis are movable to adjust the magnification and the focus of the captured image.

The imaging unit 5009 includes the imaging element, and is disposed at a stage subsequent to the lens unit 5007. Observation light passing through the lens unit 5007 is collected on the light receiving surface of the imaging element, and an image signal corresponding to an observation image is generated by photoelectric conversion. The image signal generated by the imaging unit 5009 is provided to the communication unit 5013.

As the imaging element included in the imaging unit 5009, for example, an imaging element is used which corresponds to a complementary metal oxide semiconductor (CMOS) type image sensor, has a Bayer array, and can perform color imaging. As the imaging element, for example, an imaging element capable of capturing a high-resolution image of 4K or more may be used. By obtaining the image of the surgical site with high resolution, the operator 5067 can comprehend a state of the surgical site in more detail, and can proceed with the operation more smoothly.

In addition, the imaging element included in the imaging unit 5009 is configured to include a pair of imaging elements for acquiring respective right-eye and left-eye image signals corresponding to 3D display. When 3D display is performed, the operator 5067 can more accurately comprehend a depth of living tissue at a surgical site. When the imaging unit 5009 is configured as a multi-plate system, a plurality of lens units 5007 is provided for respective imaging elements.

In addition, the imaging unit 5009 may not be provided in the camera head 5005. For example, the imaging unit 5009 may be provided inside the lens barrel 5003 immediately after the objective lens.

The drive unit 5011 includes an actuator, and moves the zoom lens and the focus lens of the lens unit 5007 by a predetermined distance along the optical axis under the control of the camera head controller 5015. In this way, the magnification and the focus of the image captured by the imaging unit 5009 can be appropriately adjusted.

The communication unit 5013 includes a communication device for transmitting and receiving various types of information to and from the CCU 5039. The communication unit 5013 transmits the image signal obtained from the imaging unit 5009 as RAW data to the CCU 5039 via the transmission cable 5065. In this instance, it is preferable that the image signal is transmitted by optical communication to display a captured image of the surgical site with low latency. During the operation, the operator 5067 performs the operation while observing a condition of the affected part using the captured image. Thus, for a safer and more reliable operation, it is required that a moving image of the surgical site be displayed in real time as much as possible. When optical communication is performed, the communication unit 5013 includes a photoelectric conversion module that converts an electric signal into an optical signal. The image signal is converted into an optical signal by the photoelectric conversion module, and then transmitted to the CCU 5039 via the transmission cable 5065.

In addition, the communication unit 5013 receives a control signal for controlling driving of the camera head 5005 from the CCU 5039. The control signal includes, for example, information related to the imaging condition such as information for specifying a frame rate of the captured image, information for specifying an exposure value at the time of imaging, and/or information for specifying the magnification and focus of the captured image. The communication unit 5013 provides the received control signal to the camera head controller 5015. Note that the control signal from the CCU 5039 may be transmitted by optical communication. In this case, the communication unit 5013 is provided with a photoelectric conversion module that converts an optical signal into an electric signal, and the control signal is converted into an electric signal by the photoelectric conversion module, and then provided to the camera head controller 5015.

Note that the above-described imaging conditions such as the frame rate, the exposure value, the magnification, the focus, etc. are automatically set by the controller 5063 of the CCU 5039 based on the acquired image signal. That is, the endoscope 5001 has a so-called auto exposure (AE) function, auto focus (AF) function, and auto white balance (AWB) function.

The camera head controller 5015 controls driving of the camera head 5005 based on a control signal from the CCU 5039 received via the communication unit 5013. For example, the camera head controller 5015 controls driving of the imaging element of the imaging unit 5009 based on the information for specifying the frame rate of the captured image and/or the information for specifying the exposure at the time of imaging. In addition, for example, the camera head controller 5015 appropriately moves the zoom lens and the focus lens of the lens unit 5007 via the drive unit 5011 based on information for designating the magnification and the focus of the captured image. The camera head controller 5015 may further have a function of storing information for identifying the lens barrel 5003 and the camera head 5005.

When a configuration of the lens unit 5007, the imaging unit 5009, etc. is disposed inside a sealed structure having high airtightness and waterproofness, the camera head 5005 can have resistance to autoclave sterilization.

Next, a functional configuration of the CCU 5039 will be described. The communication unit 5059 includes a communication device for transmitting and receiving various types of information to and from the camera head 5005. The communication unit 5059 receives an image signal transmitted from the camera head 5005 via the transmission cable 5065. In this instance, as described above, the image signal can be suitably transmitted by optical communication. In this case, the communication unit 5059 is provided with a photoelectric conversion module that converts an optical signal into an electric signal in response to optical communication. The communication unit 5059 provides the image signal converted to the electric signal to the image processing unit 5061.

In addition, the communication unit 5059 transmits a control signal for controlling driving of the camera head 5005 to the camera head 5005. The control signal may be transmitted by optical communication.

The image processing unit 5061 performs various types of image processing on an image signal corresponding to RAW data transmitted from the camera head 5005. Examples of the image processing include various known signal processing such as development processing, high image quality processing (band enhancement processing, super-resolution processing, noise reduction (NR) processing, hand-shake correction processing, etc.), enlargement processing (electronic zoom processing), etc. Further, the image processing unit 5061 performs detection processing on the image signal for performing AE, AF, and AWB.

The image processing unit 5061 includes a processor such as a CPU or a GPU, and the above-described image processing and detection processing can be performed by the processor operating according to a predetermined program. When the image processing unit 5061 includes a plurality of GPUs, the image processing unit 5061 divides information related to an image signal as appropriate, and performs image processing in parallel using the plurality of GPUs.

The controller 5063 performs various control operations related to the imaging of the surgical site by the endoscope 5001 and display of the captured image. For example, the controller 5063 generates a control signal for controlling driving of the camera head 5005. In this instance, when the imaging condition is input by the user, the controller 5063 generates a control signal based on the input by the user. Alternatively, when the endoscope 5001 has the AE function, the AF function, and the AWB function, the controller 5063 appropriately calculates an optimal exposure value, focal length, and white balance according to a result of the detection processing by the image processing unit 5061, and generates a control signal.

In addition, the controller 5063 causes the display device 5041 to display an image of the surgical site based on an image signal subjected to image processing by the image processing unit 5061. In this instance, the controller 5063 recognizes various objects in a surgical site image using various image recognition technologies. For example, the controller 5063 can recognize a surgical tool such as forceps, a specific living body part, bleeding, mist at the time of using the energy treatment tool 5021, etc. by detecting a shape, a color, etc. of an edge of an object included in the surgical site image. When the image of the surgical site is displayed on the display device 5041, the controller 5063 uses a recognition result to superimpose and display various types of operation support information on the image of the surgical site. The operation support information is superimposed and displayed to the operator 5067, it is possible to perform the operation more safely and reliably.

The transmission cable 5065 connecting the camera head 5005 and the CCU 5039 to each other is an electric signal cable corresponding to electric signal communication, an optical fiber corresponding to optical communication, or a composite cable thereof.

Here, in the illustrated example, communication is performed by wire using the transmission cable 5065. However, communication between the camera head 5005 and the CCU 5039 may be performed wirelessly. When the communication therebetween is performed wirelessly, the transmission cable 5065 may not be laid in the operating room, and thus a situation in which movement of a medical staff in the operating room is hindered by the transmission cable 5065 can be eliminated.

An example of the endoscopic surgery system 5000 to which the technology according to the present disclosure can be applied has been described above. Even though the endoscopic surgery system 5000 has been described here as an example, a system to which the technology according to the present disclosure can be applied is not limited to such an example. For example, the technology according to the present disclosure may be applied to an inspection flexible endoscope system or a microscopic surgery system.

The technology according to the present disclosure can be suitably applied to, for example, the endoscope 5001 among the configurations described above. Specifically, the aperture 200 is provided in the camera head 5005, and the endoscope 5001 can be operated by the operation knob 100 inserted into the aperture 200. The rotation amount of the operation knob 100 operated by the operator 5067 or an assistant is sent to the camera head controller 5015, the camera head controller 5015 calculates the driving amount of the zoom lens, the focus lens, etc. of the lens unit 5007, and the zoom lens, the focus lens, etc. of the lens unit 5007 are controlled based on the calculated driving amount.

Alternatively, the aperture 200 may be provided in the control unit 10 connected to the CCU 5039 via the communication cable 230, and the endoscope 5001 may be operated by the operation knob 100 inserted into the aperture 200. Specifically, the rotation amount of the operation knob 100 operated by the operator 5067 or the assistant is sent to the CCU 5039, and the CCU 5039 calculates the driving amount of the zoom lens, the focus lens, etc. of the lens unit 5007. The calculated driving amount is transmitted to the camera head controller 5015 via the communication unit 5013, and the camera head controller 5015 controls the zoom lens, the focus lens, etc. of the lens unit 5007 based on the received driving amount. Here, the CCU 5039 calculates the driving amount. However, the invention is not limited thereto, and the camera head controller 5015 may calculate the driving amount based on the rotation amount of the operation knob 100 sent via the CCU 5039.

As described above, by applying the technology according to the present disclosure to the endoscopic surgery system 5000, the operator 5067 or the assistant can more precisely control various parameters such as the focus, the zoom, etc. In addition, when the control unit 10 is applied to the endoscopic surgery system 5000, since the operation knob 100 can be installed at a suitable position for the operator 5067 or the assistant, it becomes possible to improve the convenience of the operator 5067 or the assistant.

6. Summary

As described above, according to the embodiments of the present disclosure, it is possible to stably adjust various parameters (focus, diaphragm (iris), zoom, etc.) (control target) of the imaging device without significantly changing the design of the imaging device 1. Further, according to the embodiments of the present disclosure, since the optimal operation knob 100 can be attached for each user, the various parameters can be adjusted more precisely. Additionally, according to the embodiments of the present disclosure, since the user can adjust the various parameters without directly touching the lens, vibration, etc. caused by the operation of the user is not directly transmitted to the lens, and it is possible to avoid a situation in which the various parameters may not be precisely adjusted due to vibration, etc. In addition, according to the embodiments of the present disclosure, since a large and complicated configuration such as the follow focus described above is not mounted on the imaging device 1, it is possible to easily capture an image in a narrow place, and it is possible to ensure high mobility when an image is captured. Further, according to the embodiments of the present disclosure, unlike the follow focus described above, there is no need to provide a lens gear that meshes with the lens ring. Therefore, there is no need to attach or detach the lens gear when the lens is replaced. Thus, the time required for the lens replacement operation does not increase.

Note that, in the above-described embodiments of the present disclosure, an example in which the invention is applied to adjustment of the focus of the imaging device has been described. However, in the embodiments of the present disclosure, the invention is not limited to application to focus adjustment. The embodiments of the present disclosure can be applied when the lens (the focus lens, the zoom lens, etc.) or a diaphragm mechanism of the imaging device is driven to adjust various parameters (control target) of the imaging device such as the focus, the diaphragm (iris), the zoom (including the electronic zoom), etc.

7. Supplement

As described above, the preferred embodiments of the present disclosure have been described in detail with reference to the accompanying drawings. However, the technical scope of the present disclosure is not limited to such examples. It is apparent that a person having ordinary knowledge in the technical field of the present disclosure can conceive various changes or modifications within the scope of the technical idea described in the claims, and it is understood that the changes or modifications belongs to the technical scope of the present disclosure.

In addition, the respective steps in the imaging method of the above-described embodiments may not be processed in the described order. For example, the respective steps may be processed in an appropriately changed order. In addition, the respective steps may be partially processed in parallel or individually instead of being processed in time series. Further, processing of the respective steps may not be performed according to the described method. For example, the processing may be performed according to another method by another functional block.

In addition, the effects described in this specification are merely illustrative or exemplary, and are not restrictive. That is, the technology according to the present disclosure can exhibit other effects that are obvious to those skilled in the art from the description in the present specification, in addition to or instead of the above effects.

The following configurations belong to the technical scope of the present disclosure.

(1)

An imaging device comprising:

a rotating shaft insertion portion allowed to be attached to and detached from a housing, a rotating shaft having an operation member being inserted into the rotating shaft insertion portion;

a rotation amount detector that detects a rotation amount of the rotating shaft; and a controller that controls a control target based on the rotation amount.

(2)

The imaging device according to (1), further comprising an insertion detector that detects insertion of the rotating shaft into the rotating shaft insertion portion.

(3)

The imaging device according to (1) or (2), further comprising a rotation direction detector that detects a rotation direction of the rotating shaft.

(4)

The imaging device according to any one of (1) to (3), wherein the controller includes a driving amount calculation unit that calculates a driving amount for adjusting a focus, a zoom, or a diaphragm based on the rotation amount, and a drive mechanism controller that drives a focus lens, a zoom lens, or a diaphragm mechanism based on the driving amount.

(5)

The imaging device according to (4), further comprising a storage unit that stores relation information for determining a relationship between the rotation amount and the driving amount, wherein the driving amount calculation unit calculates the driving amount based on the relation information.

(6)

The imaging device according to (5), wherein the driving amount calculation unit selects the relation information used when the driving amount is calculated according to a type of a lens mounted on the imaging device.

(7)

The imaging device according to (5), further comprising an imaging element including at least a pair of image plane phase difference detection pixels, wherein the driving amount calculation unit compares a shift from an in-focus position of a subject detected by the image plane phase difference detection pixels with a predetermined threshold, and selects the relation information for calculating the driving amount from a plurality of pieces of the relation information stored in the storage unit according to a comparison result.

(8)

The imaging device according to any one of (1) to (7), further comprising an engagement member that fixes the operation member to the housing by engagement when the rotating shaft is inserted into the rotating shaft insertion portion.

(9)

An imaging device control unit comprising:

a rotating shaft allowed to be attached to and detached from a housing, the rotating shaft having an operation member;

a rotating shaft insertion portion into which the rotating shaft is inserted;

a rotation amount detector that detects a rotation amount of the rotating shaft; and a terminal that outputs the rotation amount to the imaging device to control the imaging device.

(10)

An imaging device control operation knob including an operation member for a user to perform an operation, and a rotating shaft connected to the operation member and allowed to be inserted into a rotating shaft insertion portion provided in a housing of an imaging device, in which the imaging device control operation knob is detachably attached to the housing.

(11)

The imaging device control operation knob according to item (10), in which the operation member has a disc shape.

(12)

An imaging method comprising:

detecting that a rotating shaft is inserted into a rotating shaft insertion portion provided in a housing of an imaging device;

detecting a rotation amount of the rotating shaft rotated by an operation of a user; and controlling a control target based on the rotation amount.

(13)

The imaging method according to (12), wherein the controlling of the control target includes calculating a driving amount for adjusting a focus, a zoom, or a diaphragm based on the rotation amount, and driving a focus lens, a zoom lens, or a diaphragm mechanism based on the rotation amount.

(14)

The imaging method according to (13), further comprising comparing a shift from an in-focus position of a subject detected by a pair of image plane phase difference detection pixels with a predetermined threshold, and selecting, from a plurality of pieces of relation information for determining a relationship between the rotation amount and the driving amount, the relation information for calculating the driving amount according to a comparison result.

REFERENCE SIGNS LIST 1, 2 IMAGING DEVICE
10, 10a CONTROL UNIT
20 HOUSING
100, 100a, 100b OPERATION KNOB
102 OPERATION MEMBER
110 ROTATING SHAFT
112 ENGAGEMENT GROOVE
114, 120 SCREW
116 HEAD
118 PEDESTAL
200 APERTURE
210 SWITCH
212, 214 GEAR
216, 218, 252, 254 SCREW HOLE
220, 240 CONNECTION TERMINAL
230 COMMUNICATION CABLE
250 FIXING MEMBER

300 HOUSING
310 IMAGING ELEMENT
312 ANALOG SIGNAL PROCESSING UNIT
314 A/D CONVERSION UNIT
320 MAIN CONTROLLER
330 DISPLAY UNIT
332 STORAGE UNIT
334 OPERATION UNIT
340 OPERATION KNOB DETECTOR
342 ENCODER UNIT
344 EDGE COUNT UNIT
346 ROTATION DIRECTION DETECTOR
348 FOCUS DRIVING AMOUNT CALCULATION UNIT
500 LENS UNIT
510 LENS UNIT OPERATION UNIT
520 LENS UNIT CONTROLLER
530 DIAPHRAGM DRIVE UNIT
532 FOCUS DRIVE UNIT
534 ZOOM DRIVE UNIT
540 FIXED LENS
542 DIAPHRAGM MECHANISM
544 FOCUS LENS
546 ZOOM LENS
5000 ENDOSCOPIC SURGERY SYSTEM
5001 ENDOSCOPE
5003 LENS BARREL
5005 CAMERA HEAD
5007 LENS UNIT
5009 IMAGING UNIT
5011 DRIVE UNIT
5013, 5059 COMMUNICATION UNIT
5015 CAMERA HEAD CONTROLLER
5017 SURGICAL TOOL
5019 PNEUMOPERITONEUM TUBE
5021 ENERGY TREATMENT TOOL
5023 FORCEPS
5025a, 5025b, 5025c, 5025d TROCAR
5027 SUPPORT ARM DEVICE
5029 BASE
5031 ARM
5033a, 5033b, 5033c JOINT
5035a, 5035b LINK
5037 CART
5039 CAMERA CONTROL UNIT
5041 DISPLAY DEVICE
5043 LIGHT SOURCE DEVICE
5045 ARM CONTROL DEVICE
5047 INPUT DEVICE
5049 TREATMENT TOOL CONTROL DEVICE
5051 PNEUMOPERITONEUM DEVICE
5053 RECORDER
5055 PRINTER
5057 FOOT SWITCH
5061 IMAGE PROCESSING UNIT
5063 CONTROLLER
5065 TRANSMISSION CABLE
5067 OPERATOR (DOCTOR)
5069 PATIENT BED
5071 PATIENT

The invention claimed is:

1. An imaging device, comprising:
a rotating shaft insertion portion configured to be attached to and detached from a housing, wherein
a rotating shaft having an operation member is insertable into the rotating shaft insertion portion;
a rotation amount detector configured to detect a rotation amount of the rotating shaft;
a controller configured to control a control target based on the rotation amount, wherein the controller includes:
a driving amount calculation unit configured to calculate a driving amount to adjust the control target, wherein
the control target includes at least one of a focus, a zoom, or a diaphragm of the imaging device, and
the driving amount is calculated based on the rotation amount;
a drive mechanism controller configured to drive a focus lens, a zoom lens, or
a diaphragm mechanism of the imaging device based on the driving amount; and
a storage unit configured to store relation information to determine a relationship between the rotation amount and the driving amount,
wherein the driving amount calculation unit is further configured to calculate the driving amount based on the relation information.

2. The imaging device according to claim 1, further comprising an insertion detector configured to detect insertion of the rotating shaft into the rotating shaft insertion portion.

3. The imaging device according to claim 1, further comprising a rotation direction detector configured to detect a rotation direction of the rotating shaft.

4. The imaging device according to claim 1, wherein the driving amount calculation unit is further configured to:
select the relation information based on a type of a lens mounted on the imaging device; and
calculate the driving amount based on the selected relation information.

5. The imaging device according to claim 1, further comprising
an imaging element including at least a pair of image plane phase difference detection pixels, wherein
the at least pair of image plane phase difference detection pixels is configured to detect a shift from an in-focus position of a subject, and
the driving amount calculation unit is further configured to:
compare the detected shift from the in-focus position of the subject with a threshold value;
select the relation information from a plurality of pieces of the relation information stored in the storage unit based on a result of the comparison; and
calculate the driving amount based on the selected relation information.

6. The imaging device according to claim 1, further comprising
an engagement member configured to fix the operation member to the housing based on an engagement of the rotating shaft inserted into the rotating shaft insertion portion.

7. An imaging device control unit, comprising:
a rotating shaft configured to be attached to and detached from a housing, wherein the rotating shaft includes an operation member;
a rotating shaft insertion portion into which the rotating shaft is configured to be inserted;
a rotation amount detector configured to detect a rotation amount of the rotating shaft; and
a terminal configured to output the rotation amount to an imaging device, wherein the imaging device calculates a driving amount to control a control target of the imaging device, the driving amount is calculated based on a stored relation information to determine a relationship between the rotation amount and the driving amount, and the control target includes at least one of a focus, a zoom, or a diaphragm of the imaging device.

8. An imaging method, comprising:

detecting insertion of a rotating shaft into a rotating shaft insertion portion provided in a housing of an imaging device;

detecting a rotation amount of the rotating shaft rotated by an operation of a user;

detecting, by a pair of image plane phase difference detection pixels, a shift from an in-focus position of a subject;

comparing the shift from the in-focus position of the subject with a threshold value;

selecting, based on a result of the comparison, relation information for calculating a driving amount, wherein the relation information is selected from a plurality of pieces of relation information for determining a relationship between the rotation amount and the driving amount;

calculating the driving amount for adjusting a focus, a zoom, or a diaphragm based on the selected relation information; and driving a focus lens, a zoom lens, or a diaphragm mechanism based on the rotation amount.

* * * * *